United States Patent
Wolfe et al.

(10) Patent No.: US 12,447,498 B2
(45) Date of Patent: Oct. 21, 2025

(54) METHOD OF APPLYING A COATING COMPOSITION TO A SUBSTRATE

(71) Applicant: AXALTA COATING SYSTEMS IP CO., LLC, Wilmington, DE (US)

(72) Inventors: Michael S. Wolfe, Wilmington, DE (US); Cameron Stevens, Philadelphia, PA (US); James Neal, Corvallis, OR (US); Petra Stoffel, Cologne (DE); Matthias Baltrusch, Leverkusen (DE)

(73) Assignee: AXALTA COATING SYSTEMS IP CO., LLC, Wilmington, DE (US)

(*) Notice: Subject to any disclaimer, the term of this patent is extended or adjusted under 35 U.S.C. 154(b) by 61 days.

(21) Appl. No.: 18/687,458

(22) PCT Filed: Aug. 26, 2022

(86) PCT No.: PCT/US2022/075615
§ 371 (c)(1),
(2) Date: Feb. 28, 2024

(87) PCT Pub. No.: WO2023/034764
PCT Pub. Date: Mar. 9, 2023

(65) Prior Publication Data
US 2025/0128286 A1  Apr. 24, 2025

Related U.S. Application Data

(60) Provisional application No. 63/260,721, filed on Aug. 30, 2021.

(51) Int. Cl.
*B05D 1/02* (2006.01)

(52) U.S. Cl.
CPC ............ *B05D 1/02* (2013.01); *B05D 2401/10* (2013.01); *B05D 2502/00* (2013.01); *B05D 2508/00* (2013.01)

(58) Field of Classification Search
CPC .............................. B05D 1/02; B05D 2401/10
See application file for complete search history.

(56) References Cited

U.S. PATENT DOCUMENTS

| 2006/0213393 A1 | 9/2006 | Avci et al. |
| 2009/0197792 A1 | 8/2009 | Sengupta et al. |

(Continued)

FOREIGN PATENT DOCUMENTS

| CN | 111433301 A | 7/2020 |
| DE | 10201119083 A1 | 8/2011 |

(Continued)

*Primary Examiner* — Nathan T Leong
(74) *Attorney, Agent, or Firm* — Ingrassia Fisher & Lorenz, LLP

(57) ABSTRACT

A method includes applying a coating composition to a substrate through a high transfer efficiency applicator, wherein the coating composition comprises a polyamide wax; wherein the coating composition has a wet film thickness of at least about 30 microns measured at about 45 degrees without visible sag after cure, wherein the viscosity measured at a shear rate of about 1 s-1 recovers, after a high shear rate of about 10000 s-1 is applied for about 20 seconds, to within about 95% of a steady state viscosity achieved at greater than about 100 seconds of continuous shearing at about 1 s-1, in less than about 5 seconds; and wherein the coating composition has a complex viscosity measured at a temperature of about 60° C. that is reduced to from about 60 to about 500 mPa-s when the complex viscosity measured at about 30° C. is from about 800 to about 8000 mPa-s.

20 Claims, 10 Drawing Sheets

(56) References Cited

U.S. PATENT DOCUMENTS

2012/0252948 A1    10/2012   King et al.
2021/0189150 A1*    6/2021   Moore .................... C09D 7/41
2022/0161586 A1*    5/2022   Koerner ............... B41M 5/0047

FOREIGN PATENT DOCUMENTS

| EP | 0277420 A2 | 8/1988 |
| EP | 4074782 A1 | 10/2022 |
| EP | 4086315 A1 | 11/2022 |
| JP | 2003055582 A | 2/2003 |
| WO | 2016128418 A1 | 8/2016 |
| WO | 2019109025 A1 | 6/2019 |
| WO | 2020181064 A1 | 9/2020 |

* cited by examiner

METHOD OF APPLYING A COATING COMPOSITION TO A SUBSTRATE

CROSS-REFERENCE TO RELATED APPLICATIONS

This application is a U.S. National-Stage entry under 35 U.S.C. § 371 based on International Application No. PCT/US2022/075615, filed Aug. 26, 2022, which was published under PCT Article 21 (2) and which claims the benefit of U.S. Provisional Application No. 63/260,721, filed Aug. 30, 2021, the entire contents of which are incorporated by reference herein in their entirety.

TECHNICAL FIELD

The present disclosure generally relates to a method of applying a coating composition to a substrate utilizing a high transfer efficiency applicator to form a coating layer thereon. More specifically, this disclosure relates to use of a particular polyamide wax which allows the composition to be applied via the high transfer efficiency applicator and to cure with excellent physical and aesthetic properties.

BACKGROUND

Ink jet printing is a non-impact printing process in which droplets of ink are deposited on a substrate, typically paper or textile fabrics, in response to an electronic signal. This application process has the advantage of allowing digital printing of the substrate which can be tailored to individual requirements. The drops can be jetted onto the substrate by a variety of inkjet application methods including continuous and drop-on-demand printing. In drop-on-demand printing, the energy to eject a drop of ink can be from a thermal resistor, a piezoelectric crystal, acoustic or a solenoid valve. These methods use high transfer efficiency applicators.

In the automotive industry, a vehicle body is typically covered with a series of finishes including an electrocoat, a primer, a colored basecoat providing the color and a clear topcoat to provide addition protection and a glossy finish. Currently most automobile bodies are painted in a single color with the basecoat being applied in a single spray operation. The coating is applied with pneumatic spray or rotary equipment producing a broad jet of paint droplets with a wide droplet size distribution. This has the advantage of producing a uniform high-quality coating in a relatively short time by an automated process.

However, this process has a number of disadvantages. If the vehicle body is to be painted with multiple colors, for example if a second color is used for a pattern such as a stripe, or if a whole section of the vehicle body such as the roof is painted a different color, this requires masking the first coating and then passing the vehicle body through the paint spray process a second time to add the second color. After this second paint operation the masking must be removed. This is both time-consuming and labor-intensive adding significant cost to the operation.

A second disadvantage of the current spraying technology is that the drops of paint are sprayed in a wide jet of droplets which has a wide range of droplet sizes. As a result many of the droplets do not land on the vehicle, either because they are sprayed near the edges and so overspray the substrate, or because the smaller droplets have too low a momentum to reach the vehicle body. This excess overspray must be removed from the spray operation and disposed of safely leading to significant waste and also additional cost.

Applying coatings using a high transfer efficiency applicator may provide a solution for applying two colors to a vehicle and for minimizing overspray by generating drops of a uniform size that can be directed to a specific point on the substrate, e.g. a specific location the vehicle body, thus minimizing, or completely eliminating oversprayed droplets. In addition, digital printing can be used to print patterns or two tones on a vehicle body, either as a second color digitally printed on the top of a previously sprayed basecoat of a different color, or directly onto the primed or clearcoated vehicle substrate.

However, conventional inkjet inks have typically been formulated to print on porous substrates such as paper and textiles where the ink is rapidly absorbed into the substrate thus facilitating drying and handling of the substrate shortly after printing. In addition, although the printed articles have sufficient durability for these applications, such as printed text and pictures, or patterned fabrics, the durability requirements of an automotive coating are far greater in terms of both physical durability, such as resistance to abrasion and chipping, and long-term durability to weathering and light resistance. Furthermore, ink jet inks known in the art are formulated to have a low and generally shear-rate independent, or Newtonian, viscosity, typically below 20 cps. This is because of the limited amount of energy available in each nozzle of a printhead to eject a drop and also to avoid thickening of the ink in the channels of the printhead potentially leading to clogging.

By contrast, an automotive coating typically has significant non-Newtonian shear behavior with extremely high viscosity at low-shear to help avoid pigment settling and to ensure rapid and even set-up of the coating immediately after application, but relatively low viscosity at high shear rates to facilitate spraying and atomization of the spray into droplets.

Moreover, even if incumbent technology is suitable for use in some horizontal surface applications, other applications remain, such a vertical surface applications, wherein the incumbent technology sags to unacceptable levels. Since high transfer efficiency applicators demand very low viscosity with limited shear thinning behavior, standard approaches for imparting sag resistance for spray applied coatings cannot be employed.

More specifically, limitations imposed by zero overspray applicators (continuous streams) or high resolution drop on demand (i.e. "inkjet" printheads) typically require that high shear viscosity be very low. In contrast with spray atomization, because evaporation of solvent does not occur after ejection of the paint from the applicator and prior to impacting the substrate, viscosity buildup does not occur. Consequently, coatings will sag on non-horizontal surfaces. To achieve adequate sag resistance, rheology modifiers must be incorporated at such a high level that, while sag can be prevented, a yield stress prevents flow and leveling resulting in coating defects that are unique to zero overspray applicators. These defects include nozzle line and stripe overlap visibility. The former is due incomplete flow and leveling of streams or droplets emitted from adjacent nozzles resulting in visible and parallel lines in the direction of printhead movement. The latter is a result of application of a second stripe of paint (having width of the nozzle array) adjacent to a previously applied first stripe. While changing the index (distance between adjacent stripes) can improve the coalescence, with the high levels of rheology modifier required to prevent sag, the overlap region exhibits a visible peak or valley that cannot be eliminated by index optimization. Accordingly, there remains opportunity for improvement.

BRIEF SUMMARY

This disclosure provides a method of applying a one-component solvent-borne coating composition to a substrate utilizing a high transfer efficiency applicator to form a coating layer disposed on the substrate, the method comprising the steps of:

providing the coating composition to the high transfer efficiency applicator; and applying the coating composition to the substrate through the high transfer efficiency applicator to form the coating layer on the substrate wherein a loss of volatiles after application through the high transfer efficiency applicator is less than about 0.5 weight percent based on a total weight of the coating composition, wherein the coating composition comprises:
  A. a resin comprising an acrylic, a polyester, or combinations thereof;
  B. a melamine cross-linker;
  C. an optional pigment;
  D. an organic solvent; and
  E. a polyamide wax comprising the reaction product of (i) a fatty acid derived from a C16-C48 fatty acid; and (ii) a polyamine having an amine functionality of two or more, and is present in an amount of from about 0.1 to about 4 weight percent based on a total weight of the coating composition;

wherein the coating composition has a wet film thickness of at least about 30 microns measured at about 45 degrees without visible sag after cure at a temperature of about 60° C. or higher for at least 5 minutes;

wherein the coating composition has a viscosity measured at a shear rate of about 1 s-1 that recovers, after a high shear rate of about 10000 s-1 is applied for about 20 seconds, to within about 95% of a steady state viscosity achieved at greater than about 100 seconds of continuous shearing at about 1 s-1, in less than about 5 seconds; and wherein the coating composition has a complex viscosity measured at a temperature of about 60° C. that is reduced to from about 60 to about 500 mPa-s when the complex viscosity measured at about 30° C. is from about 800 to about 8000 mPa-s.

This disclosure also provides a method of applying a two-component solvent-borne coating composition to a substrate utilizing a high transfer efficiency applicator to form a coating layer disposed on the substrate, the method comprising the steps of:

providing the coating composition to the high transfer efficiency applicator; and applying the coating composition to the substrate through the high transfer efficiency applicator to form the coating layer on the substrate wherein a loss of volatiles after application through the high transfer efficiency applicator is less than about 0.5 weight percent based on a total weight of the coating composition, wherein the coating composition comprises:
  A. a hydroxyl-functional resin;
  B. an isocyanate cross-linker;
  C. an optional pigment;
  D. an organic solvent; and
  E. a polyamide wax comprising the reaction product of (i) a fatty acid derived from a C16-C48 fatty acid; and (ii) a polyamine having an amine functionality of two or more, and is present in an amount of from about 0.1 to about 4 weight percent based on a total weight of the coating composition;

wherein the coating composition has a wet film thickness of at least about 30 microns measured at about 45 degrees without visible sag after cure at a temperature of about 60° C. or higher for at least 5 minutes;

wherein the coating composition has a viscosity measured at a shear rate of about 1 s-1 that recovers, after a high shear rate of about 10000 s-1 is applied for about 20 seconds, to within about 95% of a steady state viscosity achieved at greater than about 100 seconds of continuous shearing at about 1 s-1, in less than about 5 seconds; and wherein the coating composition has a complex viscosity measured at a temperature of about 60° C. that is reduced to from about 60 to about 500 mPa-s when the complex viscosity measured at about 30° C. is from about 800 to about 8000 mPa-s.

BRIEF DESCRIPTION OF THE DRAWINGS

The present disclosure will hereinafter be described in conjunction with the following drawing figures, wherein like numerals denote like elements and.

DETAILED DESCRIPTION

Figure 1A:
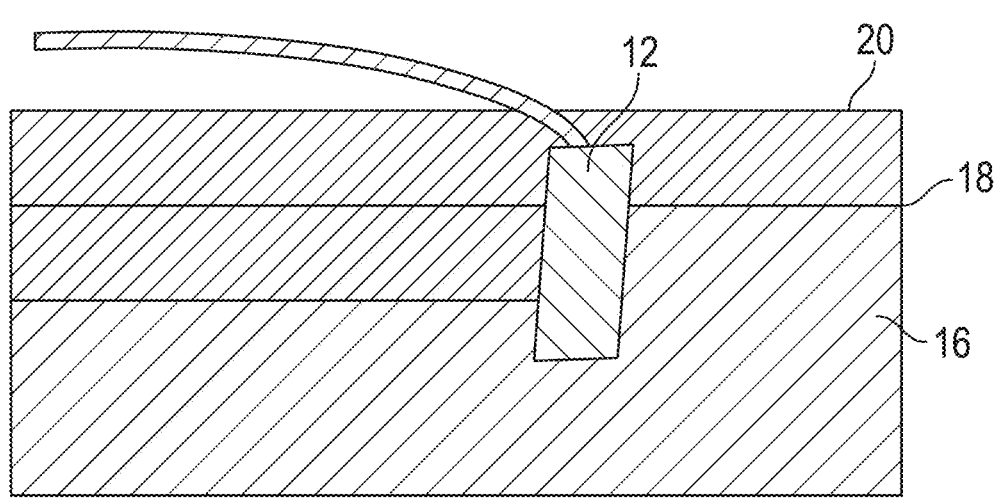
FIG. 1A is a top-view of a high transfer efficiency applicator applying a coating composition to a substrate.

The following detailed description is merely exemplary in nature and is not intended to limit the instant disclosure.

Furthermore, there is no intention to be bound by any theory presented in the preceding background or the following detailed description.

Embodiments of the present disclosure are generally directed to one- and two-component solvent borne coating compositions and methods for forming the same. For the sake of brevity, conventional techniques related to formation of such compositions may not be described in detail herein. Moreover, the various tasks and process steps described herein may be incorporated into a more comprehensive procedure or process having additional steps or functionality not described in detail herein. In particular, various steps in the manufacture of such compositions are well-known and so, in the interest of brevity, many conventional steps will only be mentioned briefly herein or will be omitted entirely without providing the well-known process details.

This disclosure provides a method of applying a one-component solvent-borne coating composition to a substrate utilizing a high transfer efficiency applicator to form a coating layer disposed on the substrate, the method comprising the steps of:

providing the coating composition to the high transfer efficiency applicator; and applying the coating composition to the substrate through the high transfer efficiency applicator to form the coating layer on the substrate wherein a loss of volatiles after application through the high transfer efficiency applicator is less than about 0.5 weight percent based on a total weight of the coating composition, wherein the coating composition comprises:
  A. a resin comprising an acrylic, a polyester, or combinations thereof;
  B. a melamine cross-linker;
  C. an optional pigment;
  D. an organic solvent; and
  E. a polyamide wax comprising the reaction product of (i) a fatty acid derived from a C16-C48 fatty acid; and (ii) a polyamine having an amine functionality of two or more, and is present in an amount of from about 0.1 to about 4 weight percent based on a total weight of the coating composition;

wherein the coating composition has a wet film thickness of at least about 30 microns measured at about 45 degrees without visible sag after cure at a temperature of about 60° C. or higher for at least 5 minutes;

wherein the coating composition has a viscosity measured at a shear rate of about 1 s-1 that recovers, after a high shear rate of about 10000 s-1 is applied for about 20 seconds, to within about 95% of a steady state viscosity achieved at greater than about 100 seconds of continuous shearing at about 1 s-1, in less than about 5 seconds; and wherein the coating composition has a complex viscosity measured at a temperature of about 60° C. that is reduced to from about 60 to about 500 mPa-s when the complex viscosity measured at about 30° C. is from about 800 to about 8000 mPa-s. In various non-limiting embodiments, all values and ranges of values, both whole and fractional, including and between the aforementioned values, are hereby expressly contemplated for use herein.

This disclosure also provides a method of applying a two-component solvent-borne coating composition to a substrate utilizing a high transfer efficiency applicator to form a coating layer disposed on the substrate, the method comprising the steps of:

providing the coating composition to the high transfer efficiency applicator; and applying the coating composition to the substrate through the high transfer efficiency applicator to form the coating layer on the substrate wherein a loss of volatiles after application through the high transfer efficiency applicator is less than about 0.5 weight percent based on a total weight of the coating composition, wherein the coating composition comprises:
  A. a hydroxyl-functional resin;
  B. an isocyanate cross-linker;
  C. an optional pigment;
  D. an organic solvent; and
  E. a polyamide wax comprising the reaction product of (i) a fatty acid derived from a C16-C48 fatty acid; and (ii) a polyamine having an amine functionality of two or more, and is present in an amount of from about 0.1 to about 4 weight percent based on a total weight of the coating composition;

wherein the coating composition has a wet film thickness of at least about 30 microns measured at about 45 degrees without visible sag after cure at a temperature of about 60° C. or higher for at least 5 minutes;

wherein the coating composition has a viscosity measured at a shear rate of about 1 s-1 that recovers, after a high shear rate of about 10000 s-1 is applied for about 20 seconds, to within about 95% of a steady state viscosity achieved at greater than about 100 seconds of continuous shearing at about 1 s-1, in less than about 5 seconds; and wherein the coating composition has a complex viscosity measured at a temperature of about 60° C. that is reduced to from about 60 to about 500 mPa-s when the complex viscosity measured at about 30° C. is from about 800 to about 8000 mPa-s. In various non-limiting embodiments, all values and ranges of values, both whole and fractional, including and between the aforementioned values, are hereby expressly contemplated for use herein.

Throughout this disclosure, the terminology "consisting essentially of" or "consist essentially of" may describe embodiments that are free of any alternative monomers, polymers, additives, reactants, fillers, solvents, etc., as determined by one of skill in the art. The terminology "free of" may be described as including less than 10, 9, 8, 7, 6, 5, 4, 3, 2, 1, 0.5, or 0.1, weight percent of the element at issue based on a total weight of the composition. In various non-limiting embodiments, all values and ranges of values, both whole and fractional, including and between the aforementioned values, are hereby expressly contemplated for use herein.

This disclosure includes the step of applying the coating composition to the substrate. The step of applying is not particularly limited. In various embodiments, the step of applying is further defined as jetting, e.g. jetting through the high transfer efficiency applicator. Alternatively, the step of applying may be further defined as printing. This step is described in greater detail below.

Moreover, the coating composition is not particularly limited and may be any known in the art that includes the components described herein. For example, this composition may be described as a one-component or "1K" composition that does not require a hardener, catalyst or activator to cure. For example, this composition may cure via exposure to air. Alternatively, this composition may be described as a two-component or "2K" composition.

The coating composition may be utilized to coat any type of substrate known in the art. In embodiments, the substrate is a vehicle, automobile, or automobile vehicle. A "vehicle" or "automobile" or "automobile vehicle" includes an automobile, such as, car, van, mini van, bus, SUV (sports utility vehicle); truck; semi truck; tractor; motorcycle; trailer; ATV (all terrain vehicle); pickup truck; heavy duty mover, such as, bulldozer, mobile crane and earth mover; airplanes; boats; ships; and other modes of transport. The coating composition may also be utilized to coat substrates in industrial applications such as buildings; fences; ceramic tiles; stationary structures; bridges; pipes; cellulosic materials (e.g., woods, paper, fiber, etc.). The coating composition may also be utilized to coat substrates in consumer products applications such as helmets; baseball bats; bicycles; and toys. It is to be appreciated that the term "substrate" as utilized herein can also refer to a coating layer disposed on an article that is also considered a substrate.

Various substrates may include two or more discrete portions of different materials. For example, vehicles can include metal-containing body portions and plastic-containing trim portions. Due to the bake temperature limitations of plastics (80° C.) relative to metals (140° C.), the metal-containing body portions and the plastic-containing trim portions may be conventionally coated in separate facilities thereby increasing the likelihood for mismatched coated parts. A coating composition suitable for plastic substrates may be applied to the plastic substrates by the high transfer efficiency applicator after application and bake of the coating composition suitable for metal substrates without the need for masking the substrate and wasting a portion of the coating composition through low-transfer efficiency application methods, such as conventional spray atomization. The coating composition suitable for plastic substrates may be applied using a first high transfer efficiency applicator and the coating composition suitable for metal substrates may be applied using a second high transfer efficiency applicator. The first high transfer efficiency applicator and the second high transfer efficiency applicator may form a high transfer efficiency applicator assembly.

The method includes the step of providing the coating composition to the high transfer efficiency applicator. The step of providing is not particularly limited and may be any known in the art. For example, the step of providing may be describe as providing one or more components of the composition, in whole or in part, combining these components to form the composition, and then providing the completed composition. Alternatively, the step of providing may be describe as pumping, flowing, moving, or otherwise delivering one or more components of the composition or the composition as a whole to the high transfer efficiency applicator. The step of providing may be described as a continuous process or a batch process. Similarly, the step of providing may include continuous sub-steps and/or batch sub-steps. In various embodiments, the step of providing is described as pumping the composition to the applicator under pressure. The step of providing may be as understood by one of skill in the art.

The method also includes the step of applying the coating composition to the substrate through the high transfer efficiency applicator to form the coating layer on the substrate. Typically, the step of applying is further defined as jetting or printing through, with, or by, the applicator. During the step of applying, a loss of volatiles after application through the high transfer efficiency applicator is less than about 0.5 weight percent based on a total weight of the coating composition. In various embodiments, this amount is less than about 0.4, 0.3, 0.2, or 0.1, weight percent based on a total weight of the coating composition. Typically, the terminology "volatiles" is defined as substances which will evaporate thereby resulting in a weight loss of the coating composition. Loss of volatiles after application would be determined by the increase in % solids after over before application where % solids in each case would be determined by gravimetrically by ASTM D2369-10, In various non-limiting embodiments, all values and ranges of values, both whole and fractional, including and between the aforementioned values, are hereby expressly contemplated for use herein.

In certain embodiments, the step of applying produces droplets of the coating composition that impact the substrate. In various embodiments, at least about 99, 99.1, 99.2, 99.3, 99.4, 99.5, 99.6, 99.7, 99.8, 99.9, or even higher, % of the droplets of the coating composition expelled from the high transfer efficiency applicator contact the substrate. Without being bound by theory, it is believed that an increase in the number of droplets contacting the substrate relative to the number of droplets that do not contact the substrate thereby entering the environment, improves efficiency of application of the coating composition, reduces waste generation, and reduces maintenance.

In various embodiments, at least about 99.5, 99.6, 99.7, 99.8, 99.9, or even higher, % of the droplets of the coating composition expelled from the high transfer efficiency applicator remain as a single droplet after contact with the substrate. Without being bound by theory, it is believed that splashing of the coating composition resulting from impact with the substrate can be minimized or eliminated by applying the coating composition utilizing the high transfer efficiency applicator. In various non-limiting embodiments, all values and ranges of values, both whole and fractional, including and between the aforementioned values, are hereby expressly contemplated for use herein.

In various embodiments, at least about 99.5, 99.6, 99.7, 99.8, 99.9, or even higher, % of the droplets of the coating composition expelled from the high transfer efficiency applicator remain as a single droplet or stream after expulsion from the high transfer efficiency applicator. Without being bound by theory, it is believed that the formation of satellite droplets can be reduced or eliminated by applying the coating composition utilizing the high transfer efficiency applicator. Satellite droplet formation may be reduced by considering the impact velocity and the nozzle diameter. In various non-limiting embodiments, all values and ranges of values, both whole and fractional, including and between the aforementioned values, are hereby expressly contemplated for use herein.

In various embodiments, liquid paint is ejected from one or more nozzles of the high transfer efficiency applicator in an engineered/controlled fashion that creates a fine stream, that may or may not breakup into droplets. This stream is targeted to the substrate such that drops arrive at specific locations to potentially form a continuous film or pattern on the subject. As a result, in many embodiments, there is essentially no overspray (drops missing their target) and nearly 100% transfer efficiency (all paint goes to targeted location on the substrate.) As will be appreciated by one of skill in the art, some allowance is made for start-up and stopping the high transfer efficiency applicator. Devices of this type can be described as drop-on-demand, stream-on demand, overspray-free, or ultra-high transfer efficiency applicators. These devices are different from spray atomization devices and techniques wherein energy, such as pneumatic, hydraulic, or centrifugal, energy, is introduced to create a partially controlled, random distribution of droplet sizes, trajectories and speeds, and wherein some additional mechanism, e.g. electrostatics and or shaping air, then guides a paint droplet cloud to a substrate. Relative to traditional paint spray, there is always some overspray and transfer efficiency loss.

The high transfer efficiency applicator itself may be any known in the art. For example, in various embodiments, the applicator is as described in one or more of patent numbers US20150375258A1, US20040217202 A1, US 2009/0304936 A1, U.S. Pat. Nos. 7,824,015 B2, 8,091,987 B2, WO 2018/206309 A1, each of which are expressly incorporated herein in their entirety for use in various non-limiting embodiments. The applicator may be alternatively described as a print head.

In one embodiment, the high transfer efficiency applicator includes a nozzle that defines a nozzle orifice and may have a nozzle diameter of from about 0.00002 m to about 0.0004 m. In another embodiment, the applicator may be fluidly connected to a reservoir configured to contain the coating composition. For example, the high transfer efficiency applicator may be configured to receive the coating composition from the reservoir and configured to expel the coating composition through the nozzle orifice to the substrate to form a coating layer. It is to be appreciated that ranges for the nozzle diameter, viscosity, density, surface tension, and relaxation time may be defined by any of the ranges described herein or any known in the art. In various non-limiting embodiments, all values and ranges of values, both whole and fractional, including and between the aforementioned values, are hereby expressly contemplated for use herein.

The high transfer efficiency applicator may be configured to expel the coating composition through the nozzle orifice at an impact velocity of from about 0.2 m/s to about 20 m/s. Alternatively, the high transfer efficiency applicator may be configured to expel the coating composition through the nozzle orifice at an impact velocity of from about 0.4 m/s to about 10 m/s. The nozzle orifice may have a nozzle diameter of from about 0.00004 m to about 0.00025 m. The coating composition may be expelled from the high transfer efficiency applicator as a droplet having a particle size of at least 10 microns. In various non-limiting embodiments, all values and ranges of values, both whole and fractional, including and between the aforementioned values, are hereby expressly contemplated for use herein.

It is contemplated that one, two, three, or even more applicators may be used in conjunction with each other. Each of the applicators may independently be as described herein or may be any known in the art.

In various embodiments, the high transfer efficiency applicator includes a plurality of nozzles with each of the nozzles defining a nozzle orifice. The plurality of the nozzles may be arranged in a linear configuration relative to one another along a first axis. For example, in various embodiments, the plurality of the nozzles includes a nozzle A and a nozzle B adjacent the nozzle A. The nozzle A and the nozzle B can be spaced from each other in a nozzle distance. The high transfer efficiency applicator distance from the substrate can be substantially the same as the nozzle distance.

In one embodiment, the plurality of the nozzles are spaced relative to each other to form a rectangular array and wherein the plurality of the nozzles can be configured to alternate expelling of the coating composition between adjacent nozzles of the rectangular array to reduce sag of the coating composition.

In various embodiments, the high transfer efficiency applicator includes fifty nozzles aligned along a y-axis. However, it is to be appreciated that an applicator can include any number of nozzles. Each nozzle may be actuated independent of the other nozzles to apply the coating composition to the substrate. During jetting, independent actuation of the nozzles can provide control for placement of each of the droplets of the coating composition on the substrate.

Two or more applicators may be coupled together to form a print head assembly. In certain embodiments, the applicators are aligned together such that the y-axis of each of the applicators are parallel to the other y-axes. Further, the nozzles of each of the applicators may be aligned with each other along an x-axis, which is perpendicular to the y-axis, such that an "array" is formed. One nozzle may be equally spaced from the other nozzles directly adjacent the one nozzle, relative to the x-axis and the y-axis. This configuration of nozzles may be suitable for applying the same coating composition by each of the applicators to the substrate as the print head assembly moves along the x-axis. Without being bound by theory, it is believed that equal spacing of the nozzles, relative to both the x-axis and the y-axis, may result in uniform application of the same coating composition on the substrate. Uniform application of the same coating composition may be suitable for single-color applications, two-tone color applications, and the like.

Alternatively, one set of nozzles along a first y-axis may be closely spaced to another set of nozzles relative to the spacing of each of the nozzles along the y-axis of a single high transfer efficiency applicator. This configuration of nozzles may be suitable for applying different coating compositions by each of the high transfer efficiency applicators to the substrate. Different coating compositions utilized within the same high transfer efficiency applicator assembly may be suitable for logos, designs, signage, striped, camouflage appearance, and the like.

The nozzles of the high transfer efficiency applicator may have any configuration known in the art, such as linear, concave relative to the substrate, convex relative to the substrate, circular, and the like. Adjustment of the configuration of the nozzles may be necessary to facilitate cooperation of the high transfer efficiency applicator to substrates having irregular configurations, such as vehicles including mirrors, trim panels, contours, spoilers, and the like.

The high transfer efficiency applicator may be configured to blend individual droplets to form a desired color. The high transfer efficiency applicator may include nozzles to apply cyan coating compositions, magenta coating compositions, yellow coating compositions, and black coating compositions. The properties of coating compositions may be modified to promote blending. Further, agitation sources, such as air movement or sonic generators may be utilized to promote blending of the coating compositions. The agitation sources may be coupled to the high transfer efficiency applicator or separate therefrom.

Identifying suitable properties of the coating composition for use in the high transfer efficiency applicator may be dependent on properties of the high transfer efficiency applicator. Properties of the high transfer efficiency applicator may include, but are not limited to, nozzle diameter of the high transfer efficiency applicator, impact velocity of the coating composition by the high transfer efficiency applicator, speed of the high transfer efficiency applicator, distance of the high transfer efficiency applicator from the substrate, droplet size of the coating composition by the high transfer efficiency applicator, firing rate of the high transfer efficiency applicator, and orientation of the high transfer efficiency applicator relative to the force of gravity.

Figure 1B:
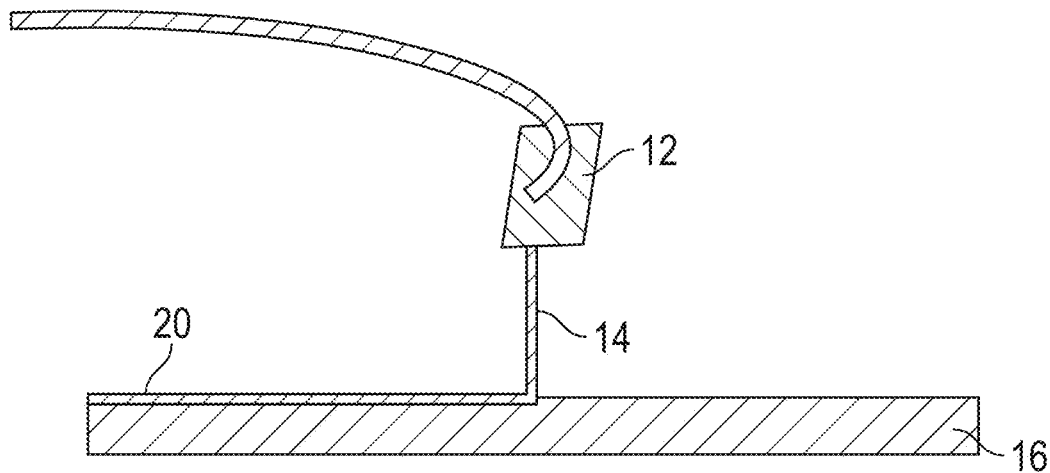
FIG. 1B is a side view of FIG. 1A.

In one embodiment, e.g. as shown in FIGS. 1A and 1B, a high transfer efficiency applicator jets a stream of the composition 14 onto the substrate 16. In FIG. 1A, a space 18 is shown between stripes 20 of the composition 14 disposed on the substrate 16. This space 18 is preferably minimized or eliminated. However, those of skill in the art appreciate that overlapping the stripes 20 can unintentionally lead to overlap and undesirable buildup of the composition and the formation of a type of "hill" or raised section of the substrate. This is also preferably minimized.

Figure 3A:
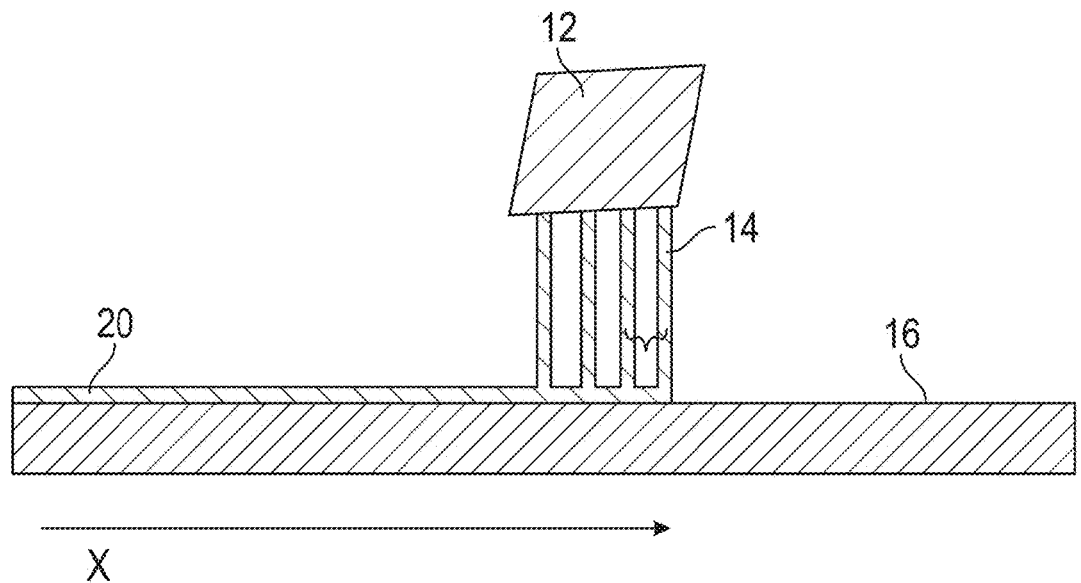
FIG. 3A is a side view of a high transfer efficiency applicator including a plurality of nozzles applying a coating composition to a substrate wherein single nozzle lines can be defined as having a periodically repeating pattern that has spacing consistent with the spacing between nozzles on the nozzle plate.
Figure 3B:
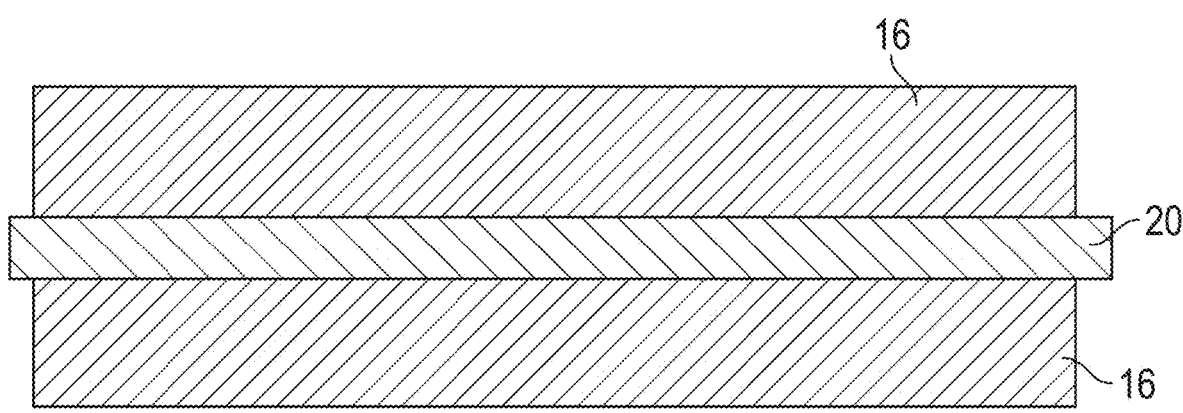
FIG. 3B is a top view of FIG. 3A showing stripes of a coating composition applied to a substrate wherein each stripe is a single pass of about 50 nozzles.
Figure 3C:
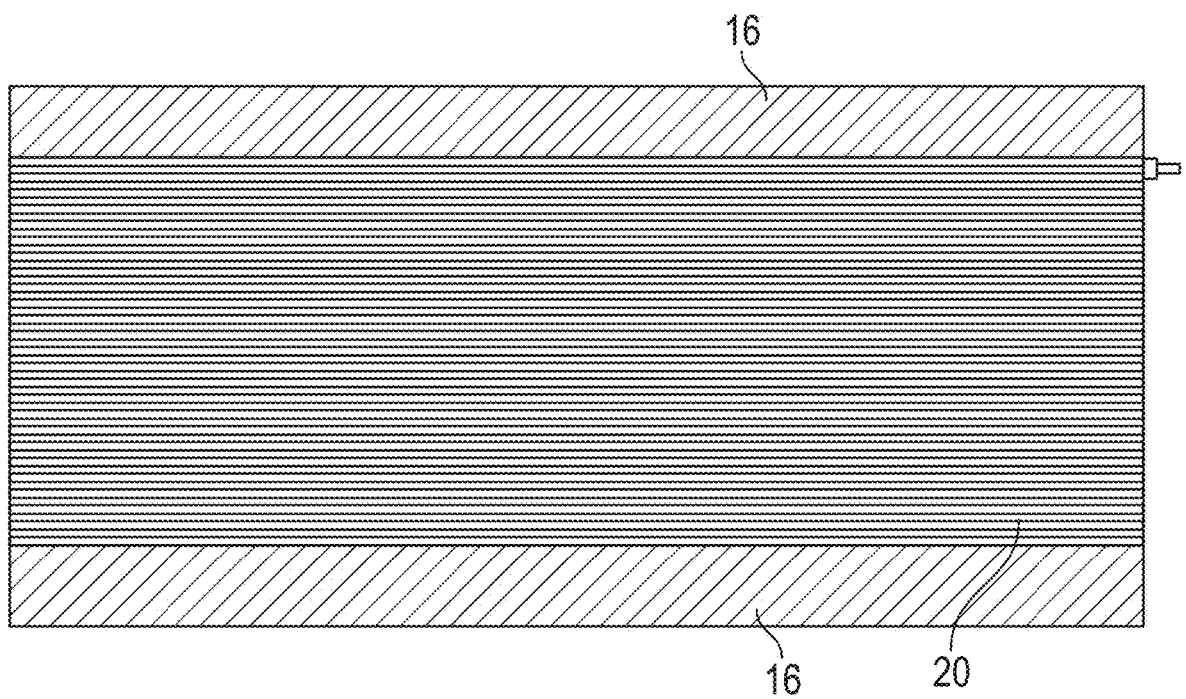
FIG. 3C is a magnified top view of a single pass of FIG. 3B wherein a defect is present where each nozzle impacted the substrate.
Figure 4:
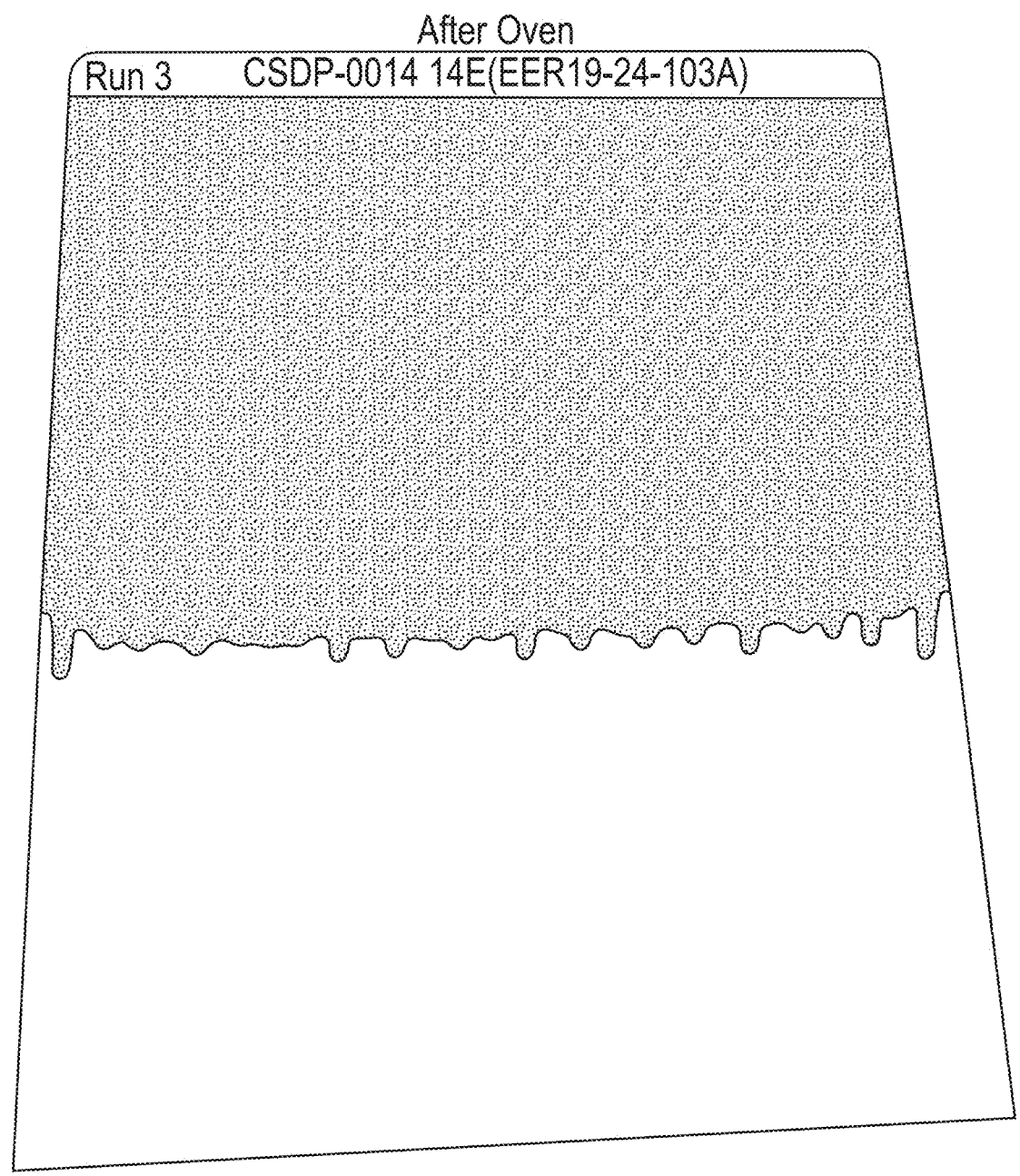
FIG. 4 is a photograph showing sag of a theoretical comparative example.
Figure 5:
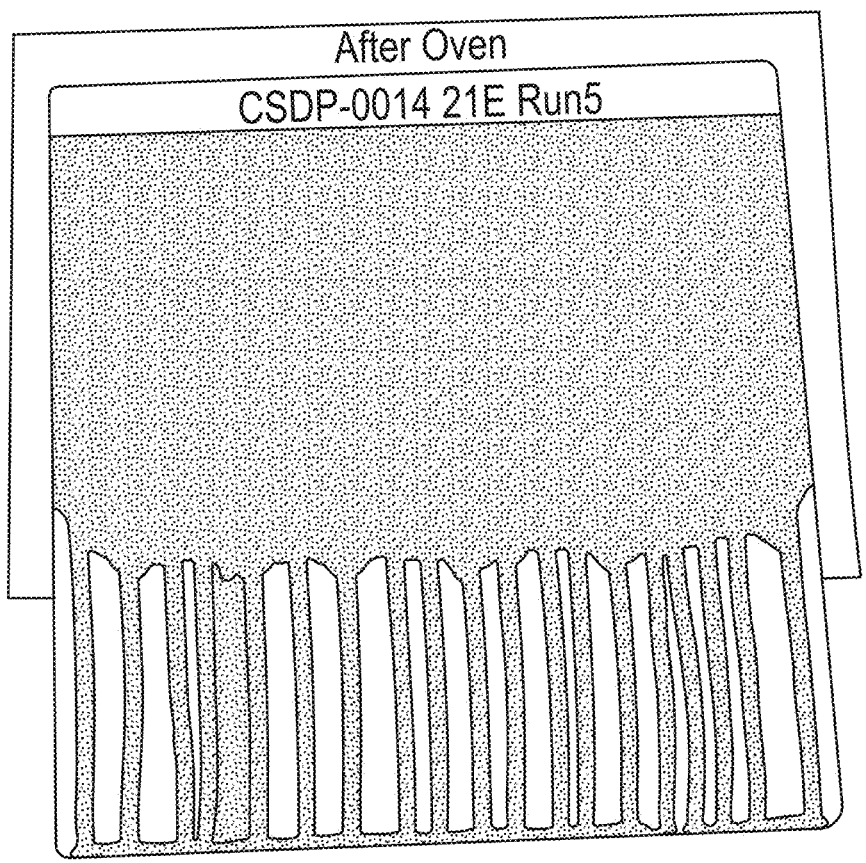
FIG. 5 is a photograph showing sag of a comparative composition with no rheology control agent is incorporated therein leading to very poor sag resistance.
Figure 6:
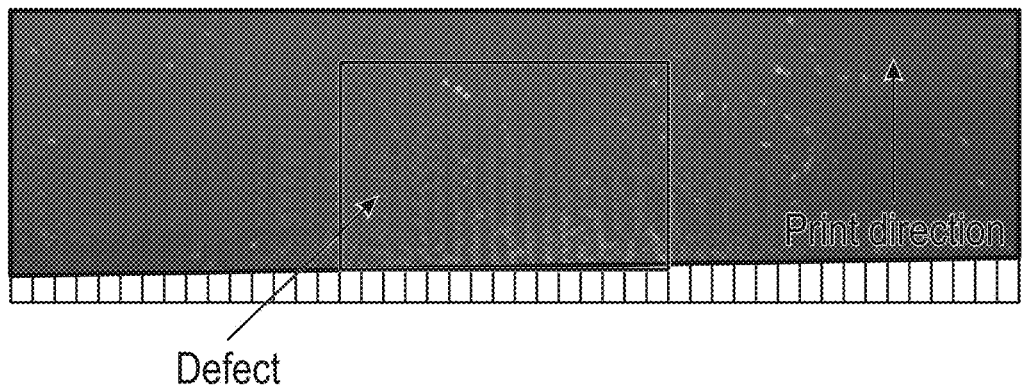
FIG. 6 is a photograph of a comparative composition showing visible nozzle line defect.
Figure 7:
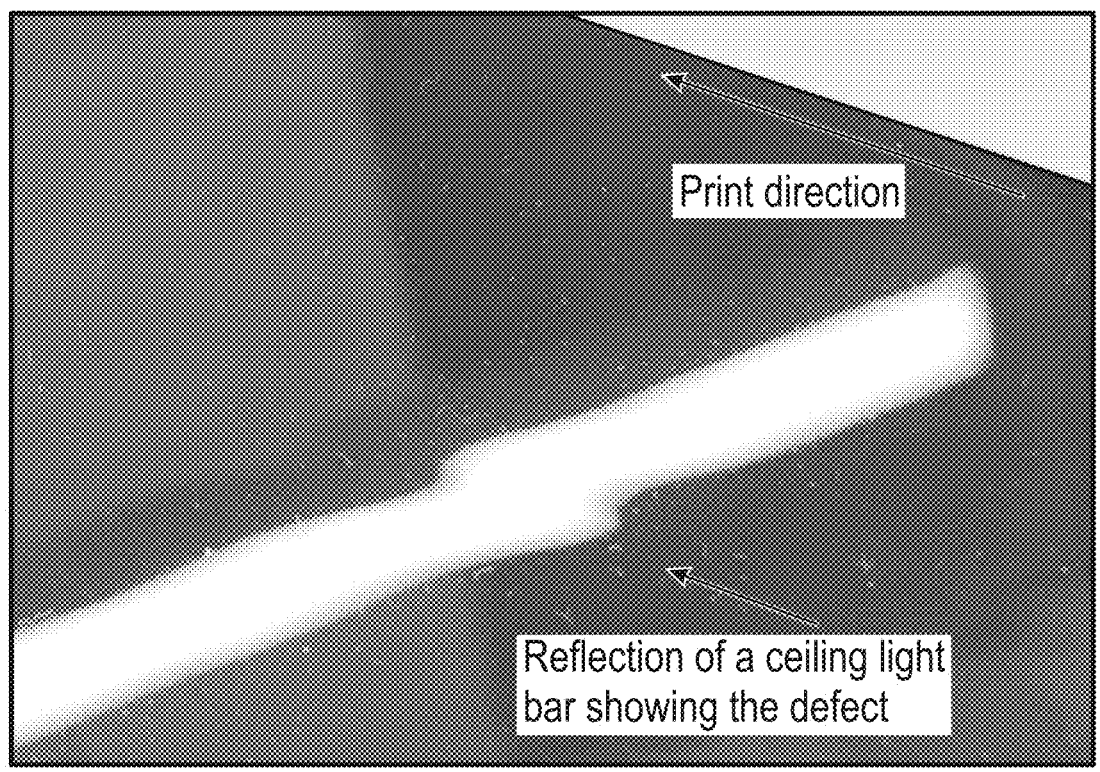
FIG. 7 is a photograph of a comparative composition showing stripe overlap defect.

In FIGS. 3A-3C, single nozzle lines are shown and can be defined as having a periodically repeating pattern that has spacing consistent with the spacing between nozzles of the high transfer efficiency applicator. This defect can be straight or squiggly. The defect may have breaks in it. Defects may appear smooth or may be raised. In FIG. 3B, each stripe is a single pass of ~50 nozzles. FIG. 3C shows as magnified view of FIG. 3A relative to a single pass of a high transfer efficiency applicator. A defect is present wherein each nozzle jet of the composition impacted a substrate 16. FIG. 4 is a photograph of a theoretical comparative composition that does not include a polyamide wax. FIG. 5 is a photograph showing sag of a comparative composition with no rheology control agent is incorporated therein leading to very poor sag resistance. FIG. 6 is a photograph of a substrate with a comparative composition disposed thereon showing visible nozzle line defect. FIG. 7 is a photograph of a substrate with a comparative composition disposed thereon showing stripe overlap defect.

Coating Composition:

Referring now to the composition itself, the composition is solvent borne and may be a one-component composition or a two-component composition. Each is described below.

One-Component Composition:

In various embodiments, the composition is, includes, consists essentially of, or consist of: a resin comprising an acrylic, a polyester, or combinations thereof; a melamine cross-linker; an optional pigment; an organic solvent; and at least one polyamide wax. For example, the terminology "consists essentially of" may describe embodiments that are free from resins or polymers not described herein or described herein as optional, cross-linkers not described herein or described herein as optional, pigments not described herein or described herein as optional, organic solvents not described herein or described herein as optional, and sag control and/or rheology control agents not described herein or described herein as optional. The terminology "free of" or "free from" may be describe that the composition includes less than about 10, 9, 8, 7, 6, 5, 4, 3, 2, 1, 0.5, or 0.1, weight percent, e.g. weight percent actives, of that compound based on a total weight of the composition. Alternatively, the terminology "free of" or "free from" may be describe that the composition is entirely free from the compound.

Two-Component Composition:

In various embodiments, the composition is, includes, consists essentially of, or consists of a hydroxyl-functional resin; an isocyanate cross-linker; an optional pigment; an organic solvent; and at least one polyamide wax. For example, the terminology "consists essentially of" may describe embodiments that are free from resins or polymers not described herein or described herein as optional, cross-linkers not described herein or described herein as optional, pigments not described herein or described herein as optional, organic solvents not described herein or described herein as optional, and sag control and/or rheology control agents not described herein or described herein as optional. The terminology "free of" or "free from" may be describe that the composition includes less than about 10, 9, 8, 7, 6, 5, 4, 3, 2, 1, 0.5, or 0.1, weight percent, e.g. weight percent actives, of that compound based on a total weight of the composition. Alternatively, the terminology "free of" or "free from" may be describe that the composition is entirely free from the compound. In various non-limiting embodiments, all values and ranges of values, both whole and fractional, including and between the aforementioned values, are hereby expressly contemplated for use herein.

Resin Comprising an Acrylic, a Polyester, or Combinations Thereof

Relative to the one-component composition, the resin may be, include, consist essentially of, or consist of, an acrylic, a polyester, or combinations thereof. For example, the terminology "consist essentially of" may describe embodiments that are free of an acrylic, a polyester, or any other polymer known in the art, wherein "free of" is as described above. For example, the composition, and/or resin itself, may include an acrylic and be free of a polyester and/or any other polymer. Alternatively, the composition, and/or the resin itself, may include a polyester and be free of an acrylic and/or any other polymer. The composition and/or the resin itself may include both an acrylic and a polyester and be free of any other polymer.

In various embodiments, the acrylic may be, include, consist essentially of, or consist of the reaction product of one or more of the following monomers including, but not limited to, (meth)acrylamide, N-substituted (meth)acrylamide, octyl(meth)acrylate, nonylphenol ethoxylate(meth)acrylate, isononyl(meth)acrylate, 1,6-hexanediol(meth)acrylate, isobornyl(meth)acrylate, 2-(2-ethoxyethoxy)ethyl (meth)acrylate, 2-ethylhexyl(meth)acrylate, lauryl(meth)acrylate, beta-carboxyethyl(meth)acrylate, isobutyl(meth)acrylate, cycloaliphatic epoxide, alpha-epoxide, 2-hydroxyethyl(meth)acrylate, (meth)acrylonitrile, maleic anhydride, itaconic acid, isodecyl(meth)acrylate, dodecyl (meth)acrylate, n-butyl(meth)acrylate, methyl(meth)acrylate, hexyl(meth)acrylate, (meth)acrylic acid, N-vinylcaprolactam, stearyl(meth)acrylate, hydroxy functional caprolactone ester(meth)acrylate, octodecyl(meth)acrylate, isooctyl(meth)acrylate, hydroxyethyl(meth)acrylate, hydroxymethyl(meth)acrylate, hydroxypropyl(meth)acrylate, hydroxyisopropyl(meth)acrylate, hydroxybutyl(meth)acrylate, hydroxyisobutyl(meth)acrylate, tetrahydrofurfuryl (meth)acrylate, combinations of these, and the like.

In other embodiments, the acrylic may be, include, consist essentially of, or consist of one or more of (meth)acrylated urethanes (i.e., urethane (meth)acrylates), (meth)acrylated epoxies (i.e., epoxy (meth)acrylates), (meth)acrylated polyesters (i.e., polyester(meth)acrylates), (meth)acrylated (meth)acrylics, (meth)acrylated silicones, (meth)acrylated amines, (meth)acrylated amides; (meth)acrylated polysulfones; (meth)acrylated polyesters, (meth)acrylated polyethers (i.e., polyether (meth)acrylates), vinyl(meth)acrylates, and (meth)acrylated oils.

In various embodiments, the polyester may be, include, consist essentially of, or consist of, any polyester known in the art. For example, the polyester may be linear or branched. Useful polyesters can include esterification products of aliphatic or aromatic dicarboxylic acids, polyols, diols, aromatic or aliphatic cyclic anhydrides and cyclic alcohols. Non-limiting examples of suitable cycloaliphatic polycarboxylic acids are tetrahydrophthalic acid, hexahydrophthalic acid, 1,2-cyclohexanedicarboxylic acid, 1,3-cyclohexanedicarboxylic acid, 1,4-cyclohexanedicarboxylic acid, 4-methylhexahydrophthalic acid, endomethylenetetrahydrophthalic acid, tricyclodecanedicarboxylic acid, endoethylenehexahydrophthalic acid, camphoric acid, cyclohexanetetracarboxylic, and cyclobutanetetracarboxylic acid. The cycloaliphatic polycarboxylic acids can be used not only in their cis but also in their trans form and as a mixture of both forms. Further non-limiting examples of suitable polycarboxylic acids can include aromatic and aliphatic polycarboxylic acids, such as, for example, phthalic acid, isophthalic acid, terephthalic acid, halogenophthalic acids, such as, tetrachloro- or tetrabromophthalic acid, adipic acid, glutaric acid, azelaic acid, sebacic acid, fumaric acid, maleic acid, trimellitic acid, and pyromellitic acid. Combinations of polyacids, such as a combination of polycarboxylic acids and cycloaliphatic polycarboxylic acids can be suitable. Combinations of polyols can also be suitable.

Non-limiting examples of suitable polyesters include a branched copolyester polymer. The branched copolyester polymer and process for production described in U.S. Pat. No. 6,861,495, which is hereby incorporated by reference, can be suitable. Monomers with multifunctional groups such as AxBy (x,y=1 to 3, independently) types including those having one carboxyl group and two hydroxyl groups, two carboxyl groups and one hydroxyl group, one carboxyl group and three hydroxyl groups, or three carboxyl groups and one hydroxyl group can be used to create branched structures. Non-limiting examples of such monomers include 2,3 dihydroxy propionic acid, 2,3 dihydroxy 2-methyl propionic acid, 2,2 dihydroxy propionic acid, 2,2-bis(hydroxymethyl) propionic acid, and the like.

The polyester can be conventionally polymerized from a monomer mixture containing a chain extender selected from the group of a hydroxy carboxylic acid, a lactone of a hydroxy carboxylic acid, and a combination thereof; and one or more branching monomers. Some of the suitable hydroxy carboxylic acids include glycolic acid, lactic acid, 3-hydroxypropionic acid, 3-hydroxybutyric acid, 3-hydroxyvaleric acid, and hydroxypyvalic acid. Some of the suitable lactones include caprolactone, valerolactone; and lactones of the corresponding hydroxy carboxylic acids, such as, e.g., 3-hydroxypropionic acid, 3-hydroxybutyric acid, 3-hydroxyvaleric acid, and hydroxypyvalic acid. In certain embodiments, caprolactone can be utilized. In embodiments, the branched copolyester polymer can be produced by polymerizing, in one step, the monomer mixture that includes the chain extender and hyper branching monomers, or by first polymerizing the hyper branching monomers followed by polymerizing the chain extenders. It is to be appreciated that the branched copolyester polymer can be formed from acrylic core with extending monomers described above.

In various embodiments, the resin comprising an acrylic, a polyester, or combinations thereof is utilized in an amount of from about 10 to about 40, about 15% to about 35%, or about 20% to about 30%, weight percent based on a total weight percent of the composition. In various non-limiting embodiments, all values and ranges of values, both whole and fractional, including and between the aforementioned values, are hereby expressly contemplated for use herein.

Hydroxyl-Functional Resin:

The hydroxyl-functional resin is not particularly limited and may be any known in the art. In various embodiments, this resin may be, include, consist essentially of, or consist of, aliphatic or aromatic dicarboxylic acids, polyols, diols, aromatic or aliphatic cyclic anhydrides and cyclic alcohols. Non-limiting examples of suitable cycloaliphatic polycarboxylic acids are tetrahydrophthalic acid, hexahydrophthalic acid, 1,2-cyclohexanedicarboxylic acid, 1,3-cyclohexanedicarboxylic acid, 1,4-cyclohexanedicarboxylic acid, 4-methylhexahydrophthalic acid, endomethylenetetrahydrophthalic acid, tricyclodecanedicarboxylic acid, endoethylenehexahydrophthalic acid, camphoric acid, cyclohexanetetracarboxylic, and cyclobutanetetracarboxylic acid. The cycloaliphatic polycarboxylic acids can be used not only in their cis but also in their trans form and as a mixture of both forms. Further non-limiting examples of suitable polycarboxylic acids can include aromatic and aliphatic polycarboxylic acids, such as, for example, phthalic acid, isophthalic acid, terephthalic acid, halogenophthalic acids, such as, tetrachloro- or tetrabromophthalic acid, adipic acid, glutaric acid, azelaic acid, sebacic acid, fumaric acid, maleic acid, trimellitic acid, and pyromellitic acid. Combinations of polyacids, such as a combination of polycarboxylic acids and cycloaliphatic polycarboxylic acids can be suitable. Combinations of polyols can also be suitable.

Non-limiting suitable polyhydric alcohols include ethylene glycol, propanediols, butanediols, hexanediols, neopentylglycol, diethylene glycol, cyclohexanediol, cyclohexanedimethanol, trimethylpentanediol, ethylbutylpropanediol, ditrimethylolpropane, trimethylolethane, trimethylolpropane, glycerol, pentaerythritol, dipentaerythritol, polyethylene glycol and polypropylene glycol. If desired, monohydric alcohols, such as, for example, butanol, octanol, lauryl alcohol, ethoxylated or propoxylated phenols may also be included along with polyhydric alcohols. Alternatively, low molar mass polyols defined by an empirical and structural formula, such as polyhydric alcohols can be utilized. In other embodiments, oligomeric or polymeric polyols with number-average molar masses of, for example, up to 8000, alternatively up to 5000, alternative up to 2000, and/or, for example, corresponding hydroxyl-functional polyethers, polyesters or polycarbonates are utilized.

In various embodiments, the hydroxyl-functional resin is utilized in an amount of from about 10% to about 50%, about 10 to about 40%, about 12% to about 30%, or about 15% to about 25%, weight percent based on a total weight percent of the composition. In various non-limiting embodiments, all values and ranges of values, both whole and fractional, including and between the aforementioned values, are hereby expressly contemplated for use herein.

The composition of this disclosure may include a crosslinker. The term "crosslinker" refers to a component having "crosslinking-functional groups" that are functional groups positioned in each molecule of the compounds, oligomer, polymer, the backbone of the polymer, pendant from the backbone of the polymer, terminally positioned on the backbone of the polymer, or a combination thereof, wherein these functional groups are capable of crosslinking with the crosslinkable-functional groups (during the curing step) to produce a coating in the form of crosslinked structures. One of ordinary skill in the art would recognize that certain combinations of crosslinking-functional group and crosslinkable-functional groups would be excluded, since they would fail to crosslink and produce the film forming crosslinked structures.

Isocyanate Cross-Linker:

The isocyanate cross-linker is not particularly limited and may be any known in the art. In various embodiments, this isocyanate cross-linker may be, include, consist essentially of, or consist of, one or more isocyanates such as, but not limited to, aromatic, aliphatic or cycloaliphatic di-, tri- or tetra-isocyanates, including polyisocyanates having isocyanurate structural units, such as, the isocyanurate of hexamethylene diisocyanate and isocyanurate of isophorone diisocyanate; the adduct of two molecules of a diisocyanate, such as, hexamethylene diisocyanate and a diol such as, ethylene glycol; uretidiones of hexamethylene diisocyanate; uretidiones of isophorone diisocyanate or isophorone diisocyanate; the adduct of trimethylol propane and meta-tetramethylxylene diisocyanate.

In various embodiments, isocyanates such as, for example, oligomers based on hexamethylene diisocyanate (HDI), diphenylmethane diisocyanate (MDI), isophorone diisocyanate (IPDI), or toluidine diisocyanate (TDI), e.g. isocyanurates, biuret, allophanates, and adducts of the isocyanates mentioned with polyhydric alcohols and mixtures thereof can be used. These can react with polyols such as, for example, OH group-containing polyesters, polyethers, acrylates and polyurethane, and mixtures thereof, which polyols may be solvent-based, solvent-free, or water-dilutable. In various embodiments, monofunctional isocyanates are contemplated for use herein, as selected by one of skill in the art. In other embodiments, blocked isocyanates are contemplated for use herein, as selected by one of skill in the art.

In various embodiments, the isocyanate cross-linker is utilized in an amount of from about 3 to about 6 or about 3, 4, 5, or 6, weight percent based on a total weight percent of the composition. In various non-limiting embodiments, all values and ranges of values, both whole and fractional, including and between the aforementioned values, are hereby expressly contemplated for use herein.

Optional Cross-Linker:

In various embodiments, an isocyanate cross-linker is not used and a melamine cross-linker is used. Alternatively, both an isocyanate cross-linker and a melamine cross-linker can be used. In various embodiments, this optionally crosslinker may be, include, consist essentially of, or consist of, any melamine cross-linker known in the art.

Melamine resins may be partially or fully etherified with one or more alcohols like methanol or butanol. A non-limiting example is hexamethoxymethyl melamine. Non-limiting examples of suitable melamine resins include monomeric melamine, polymeric melamine-formaldehyde resin, or a combination thereof. The monomeric melamines include low molecular weight melamines which contain, on an average, three or more methylol groups etherized with a $C_1$ to $C_5$ monohydric alcohol such as methanol, n-butanol, or isobutanol per triazine nucleus, and have an average degree of condensation up to about 2 and, in certain embodiments, in the range of from about 1.1 to about 1.8, and have a proportion of mononuclear species not less than about 50 percent by weight. By contrast the polymeric melamines have an average degree of condensation of more than about 1.9. Some such suitable monomeric melamines include alkylated melamines, such as methylated, butylated, isobutylated melamines and mixtures thereof. Many of these suitable monomeric melamines are supplied commercially. For example, Cytec Industries Inc., West Patterson, N.J. supplies Cymel® 301 (degree of polymerization of 1.5, 95% methyl and 5% methylol), Cymel® 350 (degree of polymerization of 1.6, 84% methyl and 16% methylol), 303, 325, 327, 370 and XW3106, which are all monomeric melamines. Suitable polymeric melamines include high amino (partially alkylated, —N, —H) melamine known as Resimene® BMP5503 (molecular weight 690, polydispersity of 1.98, 56% butyl, 44% amino), which is supplied by Solutia Inc., St. Louis, Mo., or Cymel®1158 provided by Cytec Industries Inc., West Patterson, N.J. Cytec Industries Inc. also supplies Cymel® 1130@80 percent solids (degree of polymerization of 2.5), Cymel® 1133 (48% methyl, 4% methylol and 48% butyl), both of which are polymeric melamines. In various non-limiting embodiments, all values and ranges of values, both whole and fractional, including and between the aforementioned values, are hereby expressly contemplated for use herein.

The coating composition may include more than one type of crosslinking agent that have the same or different cross-linking-functional groups. Typical crosslinking-functional groups can include hydroxyl, thiol, isocyanate, thioisocyanate, acetoacetoxy, carboxyl, primary amine, secondary amine, epoxy, anhydride, ketimine, aldimine, orthoester, orthocarbonate, cyclic amide, or combinations thereof.

In various embodiments, the optional cross-linker, e.g. a melamine cross-linker, is utilized in an amount of from about 0 to about 30, about 5 to about 30, about 12 to about 25, or about 15 to about 20, weight percent based on a total weight percent of the composition. In other embodiments, this amount is from about 5 to about 25, about 10 to about 20, about 10 to about 15, weight percent based on a total weight percent of the composition. In various non-limiting embodiments, all values and ranges of values, both whole and fractional, including and between the aforementioned values, are hereby expressly contemplated for use herein.

In exemplary embodiments, the coating composition includes a melamine-formaldehyde resin having the tradename Cymel® 303 which is commercially available from Cytec Industries Inc. of West Patterson, N.J.

Optional Pigment:

Any pigment known in the art for use in coating compositions may be utilized in the coating composition. Non-limiting examples of suitable pigments include metallic oxides, metal hydroxide, effect pigments including metal flakes, chromates, such as lead chromate, sulfides, sulfates, carbonates, carbon black, silica, talc, china clay, phthalocyanine blues and greens, organo reds, organo maroons, pearlescent pigments, other organic pigments and dyes, and combinations thereof. If desired, chromate-free pigments, such as barium metaborate, zinc phosphate, aluminum triphosphate and combinations thereof, can also be utilized.

Further non-limiting examples of suitable effect pigments include bright aluminum flake, extremely fine aluminum flake, medium particle size aluminum flake, and bright medium coarse aluminum flake; mica flake coated with titanium dioxide pigment also known as pearl pigments; and combinations thereof. Non-limiting examples of suitable colored pigments include titanium dioxide, zinc oxide, iron oxide, carbon black, mono azo red toner, red iron oxide, quinacridone maroon, transparent red oxide, dioxazine carbazole violet, iron blue, indanthrone blue, chrome titanate, titanium yellow, mono azo permanent orange, ferrite yellow, mono azo benzimidazolone yellow, transparent yellow oxide, isoindoline yellow, tetrachloroisoindoline yellow, anthanthrone orange, lead chromate yellow, phthalocyanine green, quinacridone red, perylene maroon, quinacridone violet, pre-darkened chrome yellow, thio-indigo red, transparent red oxide chip, molybdate orange, molybdate orange red, and combinations thereof.

As also introduced above, the coating composition may further include extender pigments. While extender pigments are generally utilized to replace higher cost pigments in coating compositions, the extender pigments as contemplated herein may increase shear viscosity of the coating composition as compared to a coating composition free of the extender pigments. An increase in shear viscosity of the coating composition may improve suitability of the coating composition for application to the substrate utilizing the high transfer efficiency applicator. The extender pigment may have a particle size of from about 0.01 to about 44 microns. The extender pigment may have a variety of configurations including, but not limited to, nodular, platelet, acicular, and fibrous. Non-limiting examples of suitable extender pigments include whiting, barytes, amorphous silica, fumed silica, diatomaceous silica, china clay, calcium carbonate, phyllosilicate (mica), wollastonite, magnesium silicate (talc), barium sulfate, kaolin, and aluminum silicate. In various non-limiting embodiments, all values and ranges of values, both whole and fractional, including and between the aforementioned values, are hereby expressly contemplated for use herein.

The coating composition may include the extender pigment in an amount of from about 0.1 to about 50, alternatively from about 1 to about 20, or alternatively from about 1 to about 10, wt. %, based on a total weight of the coating composition. In certain embodiments, the coating composition includes magnesium silicate (talc), barium sulfate, or a combination thereof. In various embodiments, inclusion of barium sulfate as the extender pigment results in a coating composition having greater shear viscosity as compared to inclusion of talc as the extender pigment. In various non-limiting embodiments, all values and ranges of values, both whole and fractional, including and between the aforementioned values, are hereby expressly contemplated for use herein.

In various embodiments, the optional pigment is chosen from Pigment Yellow 213, PY 151, PY 93, PY 83, Pigment Red 122, PR 168, PR 254, PR 179, Pigment Red 166, Pigment Red 48:2, Pigment Violet 19, Pigment Blue 15:1, Pigment Blue 15:3, Pigment Blue 15:4, Pigment Green 7, Pigment Green 36, Pigment Black 7 or Pigment White 6, and combinations thereof.

Organic Solvent:

The composition may also include an organic solvent. Non-limiting examples of suitable organic solvents can include aromatic hydrocarbons, such as, toluene, xylene; ketones, such as, acetone, methyl ethyl ketone, methyl isobutyl ketone, methyl amyl ketone and diisobutyl ketone; esters, such as, ethyl acetate, n-butyl acetate, isobutyl acetate, and a combination thereof. In embodiments, the evaporation rate of the solvent may have an impact on the suitability of the coating composition for printing. Certain co-solvents may be incorporated into the coating composition having increased or decreased evaporation rates thereby increasing or decreasing the evaporation rate of the coating composition.

In various embodiment, the organic solvent content is greater than about 50 wt. %, alternatively greater than 60 wt. %, alternatively greater than 70 wt. %, alternatively greater than 80 wt. %, or alternatively greater than 90 wt. %, based on a total weight of liquid carrier in the coating composition. In various non-limiting embodiments, all values and ranges of values, both whole and fractional, including and between the aforementioned values, are hereby expressly contemplated for use herein.

Polyamide Wax:

The polyamide wax may be any known in the art. For example, the polyamide wax may be any described in U.S. Pat. Nos. 4,778,843 and/or 7,837,776, the disclosures of which are expressly incorporated herein in their entireties in various non-limiting embodiments.

In various embodiments, the polyamide wax is, includes, consists essentially of, or consists of, a combination, mixture, or blend of (1) a reaction product of a specific polyamine and a carboxylic acid with at least two carboxylic moieties and (2) a low volatility liquid alcohol which has a water solubility of less than 10 mg/L at 25° C. Typically, a molar ratio between an amine functional group and a carboxyl functional group is from about 4:1 to about 1:1. The typical range is from about 1:5:1.0 to about 3:1 and most typically about 2:1. Mixtures of more than one dimer acid and/or more than one polyamine can be used. In various non-limiting embodiments, all values and ranges of values, both whole and fractional, including and between the aforementioned values, are hereby expressly contemplated for use herein.

For example, any carboxylic acid with at least two carboxylic moieties can be used. In various embodiments, dimer acids are typical while dimer acids of C16 and C18 fatty acids are particularly typical. Such dimer acids can be fully hydrogenated, partially hydrogenated, or not hydrogenated at all. Examples of typical dimer acids include products resulting from the dimerization of $C_{16}$ to $C_{18}$ unsaturated fatty acids. Fatty acid may be a dimer or may not be a dimer.

Generally when used, the dimer acids typically have an average from about 18, typically from about 28 to about 48 and more typically up to about 40 carbon atoms. Most typically dimer acids have 32 to 36 carbon atoms. In various embodiment, the acid has about 16, 18, 20, 22, 24, 26, 28, 30, 32, 34, 36, 38, 40, 42, 44, 46, or 48 carbon atoms, although the acid may have the odd number of carbon atoms between the aforementioned values. Typical dimer acids can be prepared from $C_{18}$ fatty acids, such as oleic acids. Examples of dimer acids are described in U.S. Pat. Nos. 2,482,760, 2,482,761, 2,731,481, 2,793,219, 2,964,545, 3,157,681, and 3,256,304, the entire disclosures of which are incorporated herein by reference in various non-limiting embodiments. In various non-limiting embodiments, all values and ranges of values, both whole and fractional, including and between the aforementioned values, are hereby expressly contemplated for use herein.

In various embodiments, commercially available dimer fatty acids include a mixture of monomer, dimer, and trimer acids. Typically, a suitable dimer acid has a dimer content of at least about 80%, about 85%, about 90% or about 95%. The dimer content may even be about 96, 97. 98, 99, or about 100%. In various non-limiting embodiments, all values and ranges of values, both whole and fractional, including and between the aforementioned values, are hereby expressly contemplated for use herein.

Referring now to the polyamines, these compounds typically have an amine functionality of two or more. Most typically, polyamines from the family of polyethylene polyamines having an amine functionality of two or more can be used.

In various embodiments, di-, tri-, and polyamines and their combinations are most suitable for use. Non-limiting representative amines include ethylenediamine, diethylenetriamine, triethylenetetramine, tetraethylenepentamine and other members of this series, as would be known by those of skill in the art. Branched polyamines and polyamines made with different alkyl groups may also be used. In various embodiments, triamines are typical, particularly diethylenetramine (DETA). These reactions may generate imidazolines and other side products as well. While the above is typical, other compositions of varying molar ratios of raw materials can be used. Additionally, alternate commercial dimer fatty acids can be reacted with various amines to generate the reaction polymer.

In the above, the terminology "consists essentially of" describes various non-limiting embodiments that are free of, or include less than about 10, 9, 8, 7, 6, 5, 4, 3, 2, 1, 0.5, 0.1, weight percent of one or more compounds based on a total weight of the wax or the composition as a whole. For example, these one or more compounds may be or include other waxes, other amines, other carboxyl group containing compounds, organomodified clays, finely divided (fumed) silica, etc. In various non-limiting embodiments, all values and ranges of values, both whole and fractional, including and between the aforementioned values, are hereby expressly contemplated for use herein.

In other embodiments, the polyamide wax may be, include, consist essentially of, or consist of, the reaction product of a polycarboxylic acid, an active hydrogen compound and a monocarboxylic acid capping agent. Any of the aforementioned compounds may also be utilized.

In various embodiments, the polycarboxylic acid has at least about 5 carbon atoms, typically from about 6 to about 36 carbon atoms and most typically from about 16 to about 20 carbon atoms per carboxylic acid group. In various embodiments, the polycarboxylic acid may have any number of carbons atoms from about 5 and up to about 36, wherein all intermediate values are contemplated. In fact, in various non-limiting embodiments, all values and ranges of values, both whole and fractional, including and between the aforementioned values, are hereby expressly contemplated for use herein.

While polycarboxylic acids having more than 2 carboxylic acid groups may be employed, the amount of such acids may be limited to avoid extensive crosslinking which might render the reaction product insoluble in an organic composition. This typically means that less than about 80, 75, 70, 65, 60, 55, 50, 45, 40, 35, 30, 25, 20, 15, 10, or 5 percent by weight of the total amount of polycarboxylic acid can have three or more carboxylic acid groups. In various non-limiting embodiments, all values and ranges of values, both whole and fractional, including and between the aforementioned values, are hereby expressly contemplated for use herein.

Illustrative but non-limiting polycarboxylic acids include sebacic acid, poly(butadiene)dioic acids, dodecane dicarboxylic acid and mixtures thereof. Especially typical polycarboxylic acids are oligomers of fatty acids having a carbon chain of from about 16 to about 22 carbon atoms, typically about 16 to about 18 carbon atoms or, for example, about 16, 17, 18, 19, 20, 21, or 22 carbon atoms. Exemplary but non-limiting fatty acids include those derived from soybean oil, castor oil, tall oil, corn oil, cottonseed oil, kapok seed oil, linseed oil and mixtures thereof. Even further typical are oligomers of fatty acids which are substantially comprised of the dimerized fatty acid. Typically, the dimerized fatty acid constitutes at least about 20, 25, 30, 35, 40, 45, 50, 55, 60, 65, 70, 75, 80, 85, 90, 95, or even about 100, % by weight of the oligomerized fatty acid. The oligomerized fatty acid typically also has a low monomer content such as less than about 10% by weight and more typically less than about 4% by weight. In various non-limiting embodiments, all values and ranges of values, both whole and fractional, including and between the aforementioned values, are hereby expressly contemplated for use herein.

Preparation of the oligomerized fatty acid, including the described low monomer content oligomer, is well known in the art and is disclosed, for example, in U.S. Pat. Nos. 2,793,219 and 2,955,121, the contents of which are expressly incorporated herein by reference in various non-limiting embodiments.

Additionally, suitable oligomerized fatty acids are commercially available such as certain oligomerized fatty acids available under the name Empol from Emery Industries, a division of National Distillers & Chemical Corporation and Sylvadym T-18 available from Arizona Chemical Company.

In various embodiments, the active hydrogen compound has the general formula $X_m$—R—$Y_n$ wherein R represents a group including from about 2 to about 12 carbon atoms and which may include non-reactive groups, such as ether, alkoxy or halogen groups, X and Y are independently chosen from primary amino, secondary amino and hydroxyl and m and n are at least 1, the sum of (m+n) is at least 2, and typically m and n are each 1. In various non-limiting embodiments, all values and ranges of values, both whole and fractional, including and between the aforementioned values, are hereby expressly contemplated for use herein.

In various embodiments, at least about 90%, typically at least about 95% and most typically all of the X and Y groups participating in the reaction are primary amino, secondary amino or a mixture thereof. Typically, R represents a group including from about 6 to about 12 carbon atoms and more typically R represents a group including from about 6 to about 8 carbon atoms. In various non-limiting embodiments, all values and ranges of values, both whole and fractional, including and between the aforementioned values, are hereby expressly contemplated for use herein.

In various embodiments, the active hydrogen compound can have about 3 or more active groups. However, the amount of active hydrogen compound having about 3 or more active groups is typically not selected such that the reaction product is crosslinked to an extent such that it is insoluble in the environment of an organic composition in which it is to be used. Typically, this means that the amount of active hydrogen compound having about 3 or more active hydrogen groups is less than about 10 mole percent, typically less than about 2 mole percent and most typically it is substantially absent. In various non-limiting embodiments, all values and ranges of values, both whole and fractional, including and between the aforementioned values, are hereby expressly contemplated for use herein.

Illustrative but non-limiting active hydrogen compounds include polyamines, such as 1,2-diaminoethane, 1,2- and 1,3-diaminopropane, 1,4-diaminobutane, 1,6-diaminohexane, 1,8-diaminooctane, 1,12-diaminododecane, 3,3-diaminopropyl-N-methylamine, N-alkyl-1,3-diaminopropanes wherein the alkyl group is a long carbon chain such as coco or tallow alkyl, soya alkyl, oleyl, stearyl and mixtures thereof, and amino alcohols, such as ethanolamine, 6-aminohexanol, aminoethylethanolamine and combinations thereof.

Diols which may constitute a portion of the active hydrogen compound may be chosen from 1,2-ethanediol, 1,2- and 1,3-propane diol, 1,4-butane diol, 1,6-hexanediol, diethylene glycol, triethylene glycol and combinations thereof. In various embodiments, the amount of diol is limited such that of the total active hydrogen groups participating in the reaction, at least about 90 mole percent is primary and/or secondary amino. Typical active hydrogen compounds are diamines, especially diamines having from about 6 to about 12 carbon atoms with the most typical diamine being 1,6-diaminohexane. In various non-limiting embodiments, all values and ranges of values, both whole and fractional, including and between the aforementioned values, are hereby expressly contemplated for use herein.

The capping agent is typically used to terminate the reaction product of the polycarboxylic acid and the active hydrogen compound and can be a monocarboxylic acid which can be unsaturated and hydroxylated. The monocarboxylic acid generally has from about 8 to about 22 carbon atoms. While monocarboxylic acids having fewer carbon atoms may be used to achieve certain benefits, such smaller monocarboxylic acid can be limited to less than about 20 mole percent, typically less than about 10 mole percent of the total capping agent employed and most typically are absent. In various non-limiting embodiments, all values and ranges of values, both whole and fractional, including and between the aforementioned values, are hereby expressly contemplated for use herein.

The structure of the capping agent can have a major impact on the performance of the polyamide wax. For instance, monocarboxylic acid capping agents which include unsaturation, especially a single point of unsaturation, such as oleic acid, can improve efficiency of the polyamide wax as compared to a saturated monocarboxylic acid analog.

Hydroxylated saturated monocarboxylic acids can improve the ease of dispersion (incorporation) of the polyamide wax in the composition but may reduce its efficiency in the composition. With its increased ease of dispersion, incorporation of a polyamide wax which is capped with a hydroxylated monocarboxylic acid into a composition can require less energy input than for, e.g., a similar polyamide wax capped with an unsaturated and non-hydroxylated monocarboxylic acid. Thus, it is typical to have a monocarboxylic acid capping agent including both unsaturation and hydroxylation. Further typical is a monocarboxylic acid capping agent with a single point of unsaturation (if aliphatic) or a single hydroxyl moiety and even further typical is a monocarboxylic acid capping agent with a single point of unsaturation (if aliphatic) and a single hydroxyl moiety.

The capping agent may also have a straight or branched chain and may also include groups, such as tertiary amino, alkoxy, halo, keto, etc., which do not react with the other components used to prepare the polyamide wax.

Illustrative but non-limiting examples of unsaturated aliphatic acids include linoleic acid, linolenic acid, oleic acid, monocarboxylic acids derived from dehydrated castor oil, undecylenic acid, tall oil fatty acids, soya fatty acids, and mixtures thereof. Aromatic acids, such as benzoic acid, salicylic acid and mixtures thereof may also be employed as a portion of the total capping agent.

Hydroxylated monocarboxylic acids include ricinoleic acid, 12-hydroxystearic acid, 12-hydroxydodecanoic acid, and mixtures thereof. The most typical capping agent is ricinoleic acid.

A portion of the capping agent may be composed of a compound which is not a monocarboxylic acid which is unsaturated and/or hydroxylated. For example, a portion of the capping agent may be composed of at least one non-hydroxylated, saturated aliphatic monocarboxylic acid such as octanoic acid, nonanoic acid, dodecanoic acid, octadecanoic acid, docosanoic acid, hydrogenated tallow acids, stearic acid and mixtures thereof. In various embodiments, at least about 25 mole percent, typically at least about 50 mole percent and most typically at least about 90 mole percent of the capping agent actually reacted can be the described unsaturated and/or hydroxylated monocarboxylic acid. In various non-limiting embodiments, all values and ranges of values, both whole and fractional, including and between the aforementioned values, are hereby expressly contemplated for use herein.

In various embodiments, the polyamide wax is the reaction product of oligomer of fatty acid having a carbon chain of from about 16 to about 18 carbon atoms, a diamine having from 6 to 12 carbon atoms, and an unsaturated and hydroxylated monocarboxylic acid having from about 16 to about 22 carbon atoms as capping agent with the most typical capping agent being ricinoleic acid. In various non-limiting embodiments, all values and ranges of values, both whole and fractional, including and between the aforementioned values, are hereby expressly contemplated for use herein.

In various embodiments, the specific types and amounts of the reactants are selected so as to obtain a non-resinous reaction product which can be dispersed in the composition. Thus, in various embodiments, the amount of active hydrogen compound reacted to form the reaction product may be of from about 1.0 to about 4.0, typically from about 1.0 to about 3.0 and most typically from about 1.0 to about 2.0 moles per mole of the reacted polycarboxylic acid. In various non-limiting embodiments, all values and ranges of values, both whole and fractional, including and between the aforementioned values, are hereby expressly contemplated for use herein.

The amount of capping agent selected is typically sufficient to cap the active hydrogen compound ends of the reaction product of the polycarboxylic acid and the active hydrogen compound. Typically, the amount of the capping agent reacted to form the reaction product is of from about 0.1 to about 4.0, typically from about 0.17 to about 2.0 and most typically from about 0.3 to about 2.0 moles per mole of the reacted polycarboxylic acid. In various non-limiting embodiments, all values and ranges of values, both whole and fractional, including and between the aforementioned values, are hereby expressly contemplated for use herein.

The molar amounts of the components in the reaction mixture may be different than that of the formed polyamide wax. That is, one or more of the reactants may be employed in excess. In various embodiment, an excess of about 2 to about 10% molar excess of the active hydrogen compound (e.g., diamine) can be used to accelerate the reaction and make up for that lost by co-distillation with the water of reaction. In various embodiments, a number average molecular weight (Mn) of the reaction product is from about 500 to about 12,000, typically from about 1,250 to about 8,500 and most typically from about 1,250 to about 4,000. In various embodiments, the polyamide wax is not a polymeric resin, but is instead a relatively low molecular weight compound. In various non-limiting embodiments, all values and ranges of values, both whole and fractional, including and between the aforementioned values, are hereby expressly contemplated for use herein.

The polyamide wax may be prepared according to known techniques. For example, the reactants may be charged to a suitable reaction vessel which is equipped with a mechanical stirrer, a thermometer, a Dean-Stark trap-Bartlett modification and a nitrogen inlet. The vessel can be heated with stirring under a nitrogen blanket. After completion of the reaction which can be determined by acid number (e.g., typically less than about 4), the polyamide is cooled and is discharged. If amenable to grinding, the polyamide wax can then be ground to a fine particle size. The degree of particle size reduction required or typical is dependent on the particular polyamide wax, or more properly, on the melting point of the particular polyamide wax, with the harder, higher melting polyamide waxes tending to require a finer particle size in order to achieve a satisfactory degree of dispersion in the composition.

In various embodiments, a typical general formula of the polyamide wax is as follows:

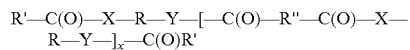

wherein R' is a residue of the monocarboxylic acid capping agent, R is a group including from about 2 to about 12 carbon atoms, each of X and Y are residues of primary amino, secondary amino or hydroxyl groups, R" is the residue of the polycarboxylic acid, and x is from about 1 to about 17, typically from about 1 to about 12 and most typically is from about 1 to about 5. In various non-limiting embodiments, all values and ranges of values, both whole and fractional, including and between the aforementioned values, are hereby expressly contemplated for use herein.

In various embodiments, and to improve the efficiency and handling, the polyamide wax can be first pre-dispersed in a compatible organic solvent, especially at a slightly elevated temperature. Typically, the solvent includes at least about 10% by weight of an alcohol and typically includes at least about 25% by weight of an alcohol. Representative alcohols include methanol, ethanol, 1-propanol, 2-propanol, 1-butanol, 2-butanol, isobutanol, isoamyl alcohol, and mixtures thereof with the typical alcohol being 2-propanol. In various embodiments, the function of the alcohol solvent is to hydrogen bond with the polyamide wax to negate or substantially reduce intermolecular polyamide-polyamide interactions. In various non-limiting embodiments, all values and ranges of values, both whole and fractional, including and between the aforementioned values, are hereby expressly contemplated for use herein.

By using an alcohol solution of the polyamide wax, greater latitude can be employed in selecting the amounts of the reactants used to prepare the polyamide wax. For example, the amount of groups participating in the reaction from the active hydrogen compound can be reduced from about 90% amino to at least about 50% amino groups. However, even in this instance, it is typical to employ more amino groups and that accordingly it is typical that at least about 75% of the groups participating in the reaction from the active hydrogen compound are primary and/or secondary amino groups. In various non-limiting embodiments, all values and ranges of values, both whole and fractional, including and between the aforementioned values, are hereby expressly contemplated for use herein.

The remaining portion of the solvent can be any organic solvent, which, with the alcohol, will provide a fluid solution of the polyamide wax. Typical cosolvents include aromatic solvents, such as benzene, toluene, xylenes, ethyl benzene, naphthalene-including solvents and mixtures thereof, and aliphatic solvents such as mineral spirits, mineral oil, hexanes, heptanes and mixtures thereof, with the most typical cosolvents being toluene and xylenes.

In various embodiments, a typical combination of solvents is 2-propanol and toluene in a weight ratio of from about 1:1 to about 1:9 and most typically from about 1:1 to about 1:4. Such a combination provides a solution which remains fluid on storage at ambient temperatures and functions as an efficient thixotrope when used in an organic solvent based application. In various embodiments, an amount of the polyamide wax pre-dispersed in the solvent is of from about 5 to about 75% by weight, typically from about 25 to about 50% by weight. In various non-limiting embodiments, all values and ranges of values, both whole and fractional, including and between the aforementioned values, are hereby expressly contemplated for use herein.

In the above, the terminology "consists essentially of" describes various non-limiting embodiments that are free of, or include less than about 10, 9, 8, 7, 6, 5, 4, 3, 2, 1, 0.5, 0.1, weight percent of one or more compounds based on a total weight of the wax or the composition as a whole. For example, these one or more compounds may be or include other waxes, other amines, other carboxyl group containing compounds, organomodified clays, finely divided (fumed) silica, etc. In various non-limiting embodiments, all values and ranges of values, both whole and fractional, including and between the aforementioned values, are hereby expressly contemplated for use herein.

In various embodiments, the polyamide wax further comprises a low volatility liquid alcohol which has a water solubility of less than about 10, 9, 8, 7, 6, 5, 4, 3, 2, or 1 mg/L. In various non-limiting embodiments, all values and ranges of values, both whole and fractional, including and between the aforementioned values, are hereby expressly contemplated for use herein.

In other embodiments, polyamine is chosen from ethylenediamine, diethylenetriamine, triethylenetetramine, tetraethylenepentamine and combinations thereof. In one embodiment, the polyamine is diethylenetriamine. In another embodiment, the fatty acid is derived from a C18 fatty acid. In a further embodiment, the C18 fatty acid is oleic acid. In another embodiment, the fatty acid comprises about 28 to about 48 carbon atoms. In another embodiment, the fatty acid comprises about 32 to about 36 carbon atoms.

In various embodiments, the polyamide wax is present in an amount of from about 0.1 to about 4 weight percent based on a total weight of the coating composition. In other embodiments, the polyamide wax is present in an amount of about 0.1 to about 1.75, 0.2 to about 3.9, about 0.3 to about 3.8, about 0.4 to about 3.7, about 0.4 to about 1.4, about 0.5 to about 3.6, about 0.6 to about 3.5, about 0.7 to about 3.4, about 0.8 to about 3.3, about 0.9 to about 3.2, about 1 to about 3.1, about 1.1 to about 3, about 1.2 to about 2.9, about 1.3 to about 2.8, about 1.4 to about 2.7, about 1.5 to about 2.6, about 1.6 to about 2.5, about 1.7 to about 2.4, about 1.8 to about 2.3, about 1.9 to about 2.2, or about 2 to about 2.1, weight percent based on a total weight of the coating composition. In various non-limiting embodiments, all values and ranges of values, both whole and fractional, including and between the aforementioned values, are hereby expressly contemplated for use herein.

In various embodiments, the coating composition also includes a polyethylene wax in combination with the polyamide wax. The polyethylene wax is not particularly limited and may be any known in the art. In one embodiment, the polyethylene wax is chosen from LDPE wax, HDPE wax, and combinations thereof. The specific polyethylene wax that may be used herein may have any molecular weight, degree and length of polymer branching, and monomer/polymer composition, so long as it is still considered a polyethylene wax by those of skill in the art. Changing any of these factors can alter the physical characteristics of the polyethylene wax, such as viscosity, hardness, melt point, reactivity, etc. In various embodiments, the polyethylene wax is described as a homopolymer polyethylene wax that can also be functionalized by oxidation that adds acid and ester functional groups to the polyethylene wax. Oxidized polyethylene wax, which can also be used, is polar and has different compatibility properties that polyethylene homopolymer wax. In various embodiments, the polyethylene wax is an anionic polyethylene wax emulsion. In various embodiments, the polyethylene wax has a melting point of from about 105 to about 125, about 110 to about 120, about 110 to about 115, about 110 to about 125, about 115 to about 125, or about 115 to about 120, ° C. In various non-limiting embodiments, all values and ranges of values, both whole and fractional, including and between the aforementioned values, are hereby expressly contemplated for use herein.

The amount of the polyethylene wax may be zero or it may be included herein. In various embodiments, the polyethylene wax is utilized in an amount of from about 0.025 to about 1, about 0.03 to about 0.1, about 0.04 to about 0.09, about 0.05 to about 0.08, about 0.06 to about 0.06, about 0.1 to about 0.9, about 0.2 to about 0.8, about 0.3 to about 0.7, about 0.4 to about 0.6, or about 0.5 to about 0.6, weight percent based on a total weight of the coating composition. In various non-limiting embodiments, all values and ranges of values, both whole and fractional, including and between the aforementioned values, are hereby expressly contemplated for use herein.

Additional Optional Components:

The coating composition can include various components, such as binders, dyes, rheology modifiers, carriers, catalysts, conventional additives, or combinations thereof. Conventional additives may include, but are not limited to, dispersants, antioxidants, UV stabilizers and absorbers, surfactants, wetting agents, leveling agents, antifoaming agents, anti-cratering agents, or combinations thereof. In embodiments, the coating composition is suitable for application to the substrate utilizing the high transfer efficiency applicator on the basis that the coating composition includes certain components and/or includes certain components in a specific amount/ratio.

In various embodiments, the coating composition may further include dyes. Non-limiting examples of suitable dyes include triphenylmethane dyes, anthraquinone dyes, xanthene and related dyes, azo dyes, reactive dyes, phthalocyanine compounds, quinacridone compounds, and fluorescent brighteners, and combinations thereof. The coating composition may include the dye in an amount of from about 0.01 to about 5, alternatively from about 0.05 to about 1, or alternatively from about 0.05 to about 0.5, wt. %, based on a total weight of the coating composition. In certain embodiments, the coating composition includes a 10% black dye solution, such as Sol. Orasol Negro RL. In various non-limiting embodiments, all values and ranges of values, both whole and fractional, including and between the aforementioned values, are hereby expressly contemplated for use herein.

The term "binder" refers to film forming constituents of the coating composition. Typically, a binder can include polymers, oligomers, or a combination thereof that are essential for forming a coating having desired properties, such as hardness, protection, adhesion, and others. Additional components, such as carriers, pigments, catalysts, rheology modifiers, antioxidants, UV stabilizers and absorbers, leveling agents, antifoaming agents, anti-cratering agents, or other conventional additives may not be included in the term "binder" unless any of these additional components are film forming constituents of the coating composition. One or more of those additional components can be included in the coating composition. In certain embodiments, the binder includes polymers. The coating composition may include the binder in an amount of from about 5 to about 70 wt. %, alternatively from about 10 to about 50 wt. %, or alternatively from about 15 to about 25 wt. %, based on a total weight of the coating composition. In various non-limiting embodiments, all values and ranges of values, both whole and fractional, including and between the aforementioned values, are hereby expressly contemplated for use herein.

As also introduced above, the coating composition may further include a catalyst. The coating composition may further include a catalyst to reduce curing time and to allow curing of the coating composition at ambient temperatures. The ambient temperatures are typically referred to as temperatures in a range of from about 18° C. to about 35° C. Non-limiting examples of suitable catalysts may include organic metal salts, such as, dibutyl tin dilaurate, dibutyl tin diacetate, dibutyl tin dichloride, dibutyl tin dibromide, zinc naphthenate; triphenyl boron, tetraisopropyl titanate, triethanolamine titanate chelate, dibutyl tin dioxide, dibutyl tin dioctoate, tin octoate, aluminum titanate, aluminum chelates, zirconium chelate, hydrocarbon phosphonium halides, such as, ethyl triphenyl phosphonium iodide and other such phosphonium salts and other catalysts, or a combination thereof. Non-limiting examples of suitable acid catalysts may include carboxylic acids, sulfonic acids, phosphoric acids or a combination thereof. In some embodiments, the acid catalyst can include, for example, acetic acid, formic acid, dodecyl benzene sulfonic acid, dinonyl naphthalene sulfonic acid, para-toluene sulfonic acid, phosphoric acid, or a combination thereof. The coating composition may include the catalysts in an amount of from about 0.01 to about 5, alternatively from about 0.05 to about 1, or alternatively from about 0.05 to about 0.5, wt. %, based on a total weight of the coating composition. In various non-limiting embodiments, all values and ranges of values, both whole and fractional, including and between the aforementioned values, are hereby expressly contemplated for use herein.

As also introduced above, the coating composition may further include conventional additives. The coating composition may further include an ultraviolet light stabilizer. Non-limiting examples of such ultraviolet light stabilizers include ultraviolet light absorbers, screeners, quenchers, and hindered amine light stabilizers. An antioxidant can also be added to the coating composition. Typical ultraviolet light stabilizers can include benzophenones, triazoles, triazines, benzoates, hindered amines and mixtures thereof. A blend of hindered amine light stabilizers, such as Tinuvin® 328 and Tinuvin®123, all commercially available from Ciba Specialty Chemicals of Tarrytown, New York, under the trade name Tinuvin®, can be utilized.

Non-limiting examples of suitable ultraviolet light absorbers include hydroxyphenyl benzotriazoles, such as, 2-(2-hydroxy-5-methylphenyl)-2H-benzotrazole, 2-(2-hydroxy-3,5-di-tert.amyl-phenyl)-2H-benzotriazole, 2[2-hydroxy-3,5-di(1,1-dimethylbenzyl)phenyl]-2H-benzotriazole, reaction product of 2-(2-hydroxy-3-tert.butyl-5-methyl propionate)-2H-benzotriazole and polyethylene ether glycol having a weight average molecular weight of 300, 2-(2-hydroxy-3-tert.butyl-5-iso-octyl propionate)-2H-benzotriazole; hydroxyphenyl s-triazines, such as, 2-[4 ((2,-hydroxy-3-dodecyloxy/tridecyloxypropyl)-oxy)-2-hydroxyphenyl]-4,6-bis(2,4-dimethylphenyl)-1,3,5-triazine, 2-[4 (2-hydroxy-3-(2-ethylhexyl)-oxy)-2-hydroxyphenyl]-4,6-bis(2,4-dimethylphenyl) 1,3,5-triazine, 2-(4-octyloxy-2-hydroxyphenyl)-4,6-bis(2,4-dimethylphenyl)-1,3,5-triazine; hydroxybenzophenone U.V. absorbers, such as, 2,4-dihydroxybenzophenone, 2-hydroxy-4-octyloxybenzophenone, and 2-hydroxy-4-dodecyloxybenzophenone.

Non-limiting examples of suitable hindered amine light stabilizers include N-(1,2,2,6,6-pentamethyl-4-piperidinyl)-2-dodecyl succinimide, N (1acetyl-2,2,6,6-tetramethyl-4-piperidinyl)-2-dodecyl succinimide, N-(2hydroxyethyl)-2,6,6,6-tetramethylpiperidine-4-ol-succinic acid copolymer, 1,3,5 triazine-2,4,6-triamine, N,N"-[1,2-ethanediybis[[[4,6-bis[butyl(1,2,2,6,6-pentamethyl-4-piperidinyl)amino]-1,3,5-triazine-2-yl]imino]-3,1-propanediyl]]bis[N,N'"-dibutyl-N', N'"-bis(1,2,2,6,6-pentamethyl-4-piperidinyl)], poly-[6-[1,1, 3,3-tetramethylbutyl)-amino]-1,3,5-trianzine-2,4-diyl][2,2, 6,6-tetramethylpiperidinyl)-imino]-1,6-hexane-diyl[(2,2,6, 6-tetramethyl-4-piperidinyl)-imino]), bis(2,2,6,6-tetramethyl-4-piperidinyl)sebacate, bis(1,2,2,6,6- pentamethyl-4-piperidinyl)sebacate, bis(1-octyloxy-2,2,6,6-tetramethyl-4-piperidinyl)sebacate, bis(1,2,2,6,6-pentamethyl-4-piperidinyl)[3,5bis(1,1-dimethylethyl-4-hydroxyphenyl)methyl]butyl propanedioate, 8-acetyl-3-dodecyl-7,7,9,9,-tetramethyl-1,3,8-triazaspiro(4,5)decane-2,4-dione, and dodecyl/tetradecyl-3-(2,2,4,4-tetramethyl-21-oxo-7-oxa-3,20-diazal dispiro(5.1.11.2)henicosan-20-yl)propionate.

Non-limiting examples of suitable antioxidants include tetrakis[methylene(3,5-di-tert-butylhydroxy hydrocinnamate)]methane, octadecyl 3,5-di-tert-butyl-4-hydroxyhydrocinnamate, tris(2,4-di-tert-butylphenyl) phosphite, 1,3,5-tris(3,5-di-tert-butyl-4-hydroxybenzyl)-1,3,5-triazine-2,4,6 (1H,3H,5H)-trione and benzenepropanoic acid, 3,5-bis(1,1-dimethyl-ethyl)-4-hydroxy-C7-C9 branched alkyl esters. In certain embodiments, the antioxidant includes hydroperoxide decomposers, such as Sanko® HCA (9,10-dihydro-9-oxa-10-phosphenanthrene-10-oxide), triphenyl phosphate and other organo-phosphorous compounds, such as, Irgafos® TNPP from Ciba Specialty Chemicals, Irgafos® 168 from Ciba Specialty Chemicals, Ultranox® 626 from GE Specialty Chemicals, Mark PEP-6 from Asahi Denka, Mark HP-10 from Asahi Denka, Irgafos® P-EPQ from Ciba Specialty Chemicals, Ethanox 398 from Albemarle, Weston 618 from GE Specialty Chemicals, Irgafos® 12 from Ciba Specialty Chemicals, Irgafos® 38 from Ciba Specialty Chemicals, Ultranox® 641 from GE Specialty Chemicals, and Doverphos® S-9228 from Dover Chemicals.

The coating compositions may further include other additives known in the art for use in coating compositions. Non-limiting examples of such additives can include wetting agents, leveling and flow control agents, for example, Resiflow® S (polybutylacrylate), BYK® 320 and 325 (high molecular weight polyacrylates), BYK® 347 (polyether-modified siloxane) under respective trade names, leveling agents based on (meth)acrylic homopolymers; rheological control agents; thickeners, such as partially crosslinked polycarboxylic acid or polyurethanes; and antifoaming agents. The other additives can be used in conventional amounts familiar to those skilled in the art. In embodiments, the wetting agents, leveling agents, flow control agents, and surfactants of the coating composition can affect the surface tension of the coating composition and thus may have an impact on the suitability of the coating composition for printing. Certain wetting agents, leveling agents, flow control agents, and surfactants may be incorporated into the coating composition for increasing or decreasing the surface tension of the coating composition.

The coating composition may have a solids content of from about 5 to about 90, alternatively from 5 to about 80, or alternatively about 15 to about 70, wt. %. The solids content may be determined in accordance with ASTM D2369-10. In certain embodiments, the higher solids content for the coating composition may be desired due to the coating composition not undergoing atomization utilizing conventional spray equipment. In various non-limiting embodiments, all values and ranges of values, both whole and fractional, including and between the aforementioned values, are hereby expressly contemplated for use herein.

The coating composition may be substantially free of a dye. The term "substantially" as utilized herein means that the coating composition may include insignificant amounts of dye such that the color and/or properties of the coating composition are not impacted by the addition of the insignificant amount of the dye which still being considered substantially free of a dye. In embodiments, the coating composition being substantially free of a dye includes no greater than 5 wt. %, alternatively no greater than 1 wt. %, or alternatively no greater than 0.1 wt. %. In various non-limiting embodiments, all values and ranges of values, both whole and fractional, including and between the aforementioned values, are hereby expressly contemplated for use herein.

In various embodiments, the composition is free of a clay and silica. The terminology "free of" may describe that the composition includes less than 10, 9, 8, 7, 6, 5, 4, 3, 2, 1, 0.5, or 0.1, weight percent of the clay and/or silica based on a total weight of the composition. Alternatively, the composition may be completely free of the clay or silica. The clay is not particularly limited and may be clay particles surface functionalized with quaternary amines. Similarly, the silica is not particularly limited and may be organophilic phyllosilicates, amorphous silica such as CAS: 92797-60-9, AEROSIL R-805 VV90, and combinations thereof. In various non-limiting embodiments, all values and ranges of values, both whole and fractional, including and between the aforementioned values, are hereby expressly contemplated for use herein.

In various embodiments, the composition is free of, or includes less than about 10, 9, 8, 7, 6, 5, 4, 3, 2, 1, 0.5, or 0.1, weight percent of at least one polyurea crystal sag control agent based on a total weight of the composition. Such an agent is typically the reaction product of an amine and an isocyanate. Both the amine and the isocyanate are not particularly limited and may be any known in the art or described above. For example, the amine may be a primary or secondary amines. The amines typically include hydroxyl and/or ether groups. In various embodiments, the amine is a mono-, di-, tri-, or poly-amine. In various embodiments, the use of di-, tri-, and/or polyamines requires use of a monofunctional isocyanate.

In various embodiments, the method further includes the step of curing the coating composition on the substrate, wherein the high transfer efficiency applicator comprises a plurality of nozzles, wherein the step of applying is further defined as applying the coating composition through the nozzles in a plurality of lines on the substrate, and wherein the coating composition is free of visual appearance defects due to incomplete flow and leveling from individual nozzle lines after the step of curing.

In other embodiments, the method further includes the step of curing the coating composition on the substrate, wherein the high transfer efficiency applicator comprises a plurality of nozzles, wherein the step of applying is further defined as applying the coating composition through the nozzles in a plurality of lines on the substrate in a direction (X) along the substrate wherein each line partially overlaps with an adjacent line to form an overlap region and a non-overlap region, wherein the overlap region is visually smooth such that there is less than an about 1 micron variation in thickness of the overlap region as compared to the thickness of the non-overlap region measured after the step of curing over a 5 mm distance measured perpendicularly to the direction (X).

In various embodiments, the high transfer efficiency applicator comprises a nozzle having a diameter and the step of applying the coating composition to the substrate through the high transfer efficiency applicator results in minimized nozzle clogging, wherein the coating composition is free of any component that has an average particle size greater than about 10% of the nozzle diameter. The nozzle and nozzle diameter may be any as described in this disclosure or known in the art.

In one embodiment,
A. the resin is an OH functional acrylic resin having a Mw of 5500 and hydroxy content of 97 mgKOH/g;
B. the melamine cross-linker comprises
a methylated, iso-butylated melamine formaldehyde resin; and
a methylated, iminio type (triether) melamine formaldehyde resin;
C. the optional pigment is a 20% carbon black dispersion; and
D. the organic solvent is an aromatic hydrocarbon naphthalene depleted solvent; and wherein the coating composition further comprises a hydroxylated acrylic polyol with a 4.5% modified hydroxy content. The polyamide wax may be any described herein.

In another embodiment,
A. the resin is an OH functional branched acrylic resin having a Mw of 34,500 and a hydroxy content of 54 mgKOH/g;
B. the melamine cross-linker comprises
a methylated, iso-butylated melamine formaldehyde resin; and
a methylated, iminio type (Triether) melamine formaldehyde resin;
C. the optional pigment is a 20% Carbon black dispersion; and
D. the organic solvent is an aromatic hydrocarbon naphthalene depleted solvent; wherein the coating composition further comprises a hydroxylated acrylic polyol with a 4.5% modified hydroxy content. The polyamide wax may be any described herein.

Evaluation of Sag:

In various embodiments, the coating composition has a wet film thickness of at least about 30 microns measured at about 45 degrees without visible sag after cure at a temperature of about 60° C. or higher for at least about 5, 10, 15, 20, 25, or 30 minutes, etc. For example, this wet film thickness may be from about 30 micron to about 150 microns, or about 40 to about 120, microns measured at about 45 degrees without visible sag. In other embodiments, the wet film thickness may be about 35 to about 145, about 40 to about 140, about 45 to about 135, about 40 to about 130, about 45 to about 125, about 50 to about 120, about 55 to about 115, about 60 to about 110, about 65 to about 105, about 70 to about 100, about 75 to about 95, about 80 to about 90, or about 85 to about 90, microns. In various non-limiting embodiments, all values and ranges of values, both whole and fractional, including and between the aforementioned values, are hereby expressly contemplated for use herein.

Figure 2A:
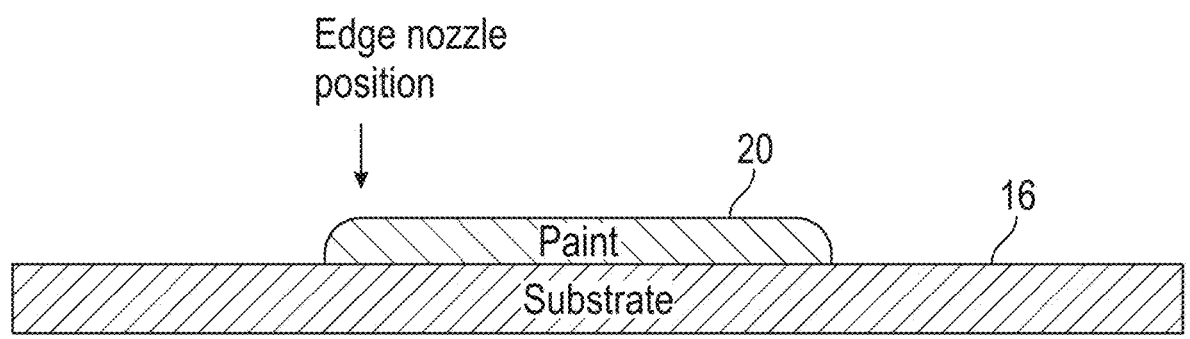
FIG. 2A is a side view of a substrate with a paint (coating composition) disposed thereon showing a position of an edge nozzle of a high transfer efficiency applicator.
Figure 2B:
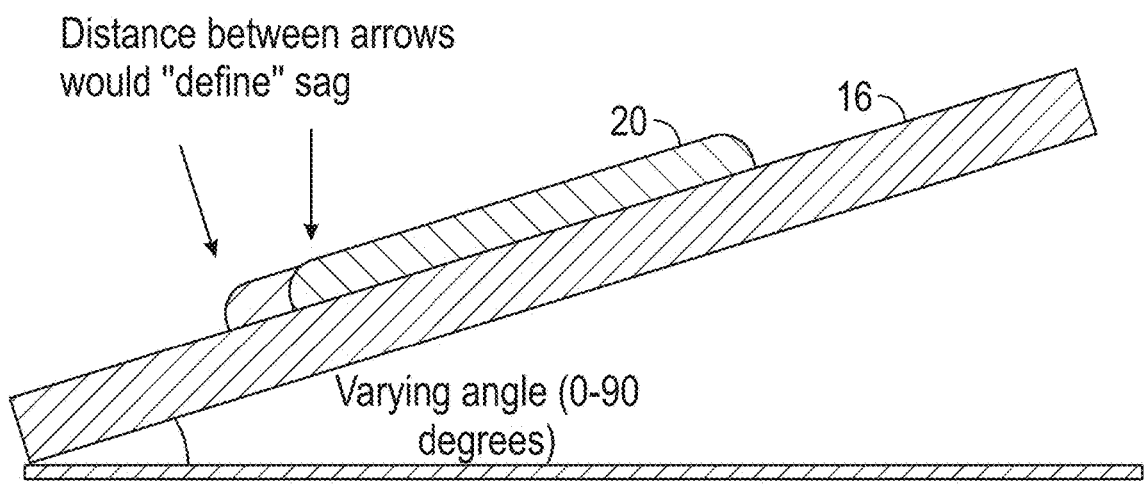
FIG. 2B is a side view of the substrate of FIG. 2A that is tilted during a process of determining sag wherein an angle of the substrate as compared to a horizontal surface is indicated.

To evaluate sag, the following procedure is typically employed:
A substrate panel is oriented horizontally prior to coating application;
A high transfer efficiency applicator is used to apply 3 successive stripes of the coating composition to the horizontal substrate panel such that the composition will overlap to provide a continuous coated surface with a target wet film thickness (typically 30 microns or greater) and a coated substrate width of about 150 mm;
After application of the composition, the panel is tilted so that the approximately 150 mm coated substrate width is at an angle of about 20 to about 45 degrees from horizontal, e.g. as shown in FIG. 2B;
After about 10 minutes at room temperature, with the panel angle maintained the same, the panel is baked at about 140° C. for about 30 minutes;
Sag, if present, is evidenced by drips at the bottom edge of the coating, and is evaluated visually, e.g. as shown in FIGS. 4 and 5;
If present, nozzle line visibility will be observed as a fine lines parallel to each other as well as the application direction and having a spacing the same as the adjacent nozzles in the applicator (~1 mm), e.g. as shown in FIG. 3;
If present, stripe overlap visibility will be assessed visually in the region where coating is applied in sequential application passes. It is found that as little as 1 micron thickness variation over a 5 mm distance parallel to the direction of application will result in stripe overlap visibility, e.g. as shown in FIGS. 3-4.

The use of the instant coating composition may reduce or eliminate nozzle clogging. For example, high transfer efficiency "stream on demand" or "drop on demand" applicators generally include an array of fine diameter nozzles that each has a nozzle diameter of about 20 microns to 200 microns. It is typically expected for reliable fluid jetting that the particle size of any ingredient of the coating composition must be no bigger than about 10% of the nozzle diameter. While some ingredients of the coating composition may have an average size that meets this criteria, if there is a small content of oversized particles, over time, nozzle clogging will occur. The consequence is either a partially clogged nozzle which may result in misdirected drops or streams, or a completely clogged nozzle which will prevent fluid ejection. In either case, this will result in a coating defect. Clogging can be evaluated in two manners: (1) plugging of a filter installed prior to the applicator and (2) missing lines during coating application followed by microscope verification of debris in nozzle.

While well known coating appearance attributes including gloss, distinctness of image and orange peel can be quantified by various instruments, this is not the case for nozzle line and stripe overlap visibility. Coatings applied with a high transfer efficiency applicator may have high gloss, high distinctness of image, no orange peel, but still have visible nozzle line and stripe overlap defects. As shown schematically in FIG. 3C, item 20 represents a line of paint deposited from a single nozzle parallel to the direction of application. While lines may be visible immediately after application, if sufficient flow and leveling does not occur, after coating cure, they may still be visible thereby non-uniform and generally undesirable coating appearance. Typically, nozzle line visibility gives a striated appearance with a distance between visible lines having the same spacing as the nozzles on the applicator. The stripe overlap defect is also parallel to the direction of application, however, the defect is not associated with applicator nozzle spacing. It is only present where application of adjacent stripes applied sequentially next to each other overlap and is visible over a length scale of 5-10 mm perpendicular to the application direction While it is typically assessed by comparison with a printed control coating with low viscosity and no rheology control agent, the defect may be visible when the difference in height of high regions vs low regions is greater than 1-2 microns.

Evaluation of Viscosity:

In other embodiments, the coating composition has a viscosity measured at a shear rate of about 1 s-1 that recovers, after a high shear rate of about 10000 s-1 is applied for about 20 seconds, to within about 95% of a steady state viscosity achieved at greater than about 100 seconds of continuous shearing at about 1 s-1, in less than about 5 seconds. More specifically, this viscosity can be measured using ASTM 2196. In various non-limiting embodiments, all values and ranges of values, both whole and fractional, including and between the aforementioned values, are hereby expressly contemplated for use herein.

In various embodiments, the high shear rate can vary about 1, 2, 3, 4, 5, 6, 7, 8, 9, 10, 15, 20, or 25% from any value herein. Similarly, in other embodiments, the time of high shear rate application can vary about 1, 2, 3, 4, 5, 6, 7, 8, 9, 10, 15, 20, or 25 seconds from any value herein. In other embodiments, the recovery to within about 95% can vary about 1, 2, 3, 4, 5, 6, 7, 8, 9, or 10% from any value herein. In other embodiments, the measurement of greater than about 100 seconds can vary about 1, 2, 3, 4, 5, 6, 7, 8, 9, 10, 15, 20, or 25% from any value herein. In other embodiments, the continuous shearing value can vary about 1, 2, 3, 4, 5, 6, 7, 8, 9, 10, 15, 20, or 25% from any value herein. Finally, in still other embodiments, the less than 5 seconds value can vary about 1, 2, 3, 4, 5, 6, 7, 8, 9, or 10 seconds from any value herein. In various non-limiting embodiments, all values and ranges of values, both whole and fractional, including and between the aforementioned values, are hereby expressly contemplated for use herein.

In other embodiments, the coating composition has a complex viscosity that is measured at a temperature of about 60° C. and that is reduced to from about 60 to about 500 mPa-s when the complex viscosity measured at about 30° C. is from about 800 to about 8000 mPa-s. In various embodiments, the 30° C. and/or 60° C. may each independently vary about 1, 2, 3, 4, 5, 6, 7, 8, 9, 10, 15, 20, or 25%. In other embodiments, the 60 and/or 500 mPa-s may each independently vary about 1, 2, 3, 4, 5, 6, 7, 8, 9, 10, 15, 20, or 25% from any value herein. In other embodiments, the 80 and/or 8000 mPa-s may each independently vary about 1, 2, 3, 4, 5, 6, 7, 8, 9, 10, 15, 20, or 25% from any value herein. In various embodiments, the range of about 60 to about 500 may alternatively be about 70 to about 490, about 80 to about 480, about 90 to about 470, about 100 to about 460, about 110 to about 450, about 120 to about 440, about 130 to about 430, about 140 to about 420, about 150 to about 410, about 160 to about 400, about 170 to about 390, about 180 to about 380, about 190 to about 370, about 200 to about 360, about 210 to about 350, about 220 to about 340, about 230 to about 330, about 240 to about 320, about 250 to about 310, about 260 to about 300, about 270 to about 290, or about 280 to about 290, mPa-s. In other embodiments, the range of from about 800 to about 8000 may alternatively be about 1000 to about 7500, about 1500 to about 7000, about 2000 to about 6500, about 2500 to about 6000, about 3000 to about 5500, about 3500 to about 5000, or about 4000 to about 4500, mPa-s. In other embodiments, the value may be 800, 810, 820 . . . etc up to about 8000, mPa-s. In various non-limiting embodiments, all values and ranges of values, both whole and fractional, including and between the aforementioned values, are hereby expressly contemplated for use herein.

In still other embodiments, the coating composition has a high shear rate viscosity of from about 20 to about 70 mPa-s measured at 1000 s-1 and a low shear viscosity of from about 800 to about 8000 mPa-s measured at shear rate of about 1 s-1. In various embodiments, the high shear rate viscosity may be about 25 to about 65, about 30 to about 60, about 35 to about 55, about 40 to about 50, or about 45 to about 55, mPa-s measured at 1000 s-1. The low shear viscosity may independently be any described above. In various non-limiting embodiments, all values and ranges of values, both whole and fractional, including and between the aforementioned values, are hereby expressly contemplated for use herein.

EXAMPLES

A series of Examples are made and evaluated as described below to determine various physical properties. Inventive Examples include Examples 1-6. Examples 1-3 include only polyamide wax as the rheology control agent. Examples 4 and 5 include polyamide wax in combination with polyethylene wax. Example 6 includes polyamide wax in combination with a strong sag control agent. Comparative Examples include Examples 7-12, which do not include the polyamide wax of this disclosure. The amounts of the various components of the Examples are set forth in the Tables below wherein values are in weight percent based on 100 total weight percent of the Examples, unless otherwise indicated.

| Inventive Examples | 1 | 2 | 3 | 4 | 5 | 6 |
|---|---|---|---|---|---|---|
| Bis(1,2,2,6,6-Pentamethyl-4-Piperdinyl) Se | 0.218 | 0.226 | 0.229 | 0.222 | 0.218 | 0.229 |
| Melamine-Formaldehyde Resin | 0 | 0 | 0 | 0 | 0 | 0 |
| Melamine Formaldehyde Resin 2 | 14.914 | 15.42 | 15.71 | 12.141 | 11.941 | 17.384 |
| Silicone additive | 0.05 | 0.051 | 0.052 | 0.051 | 0.05 | 0.052 |
| Hydroxylated acrylic resin with SCA | 0 | 0 | 0 | 0 | 0 | 0 |
| Hydroxylated acrylic resin with strong SCA | 0 | 0 | 0 | 0 | 0 | 12.316 |
| Ultraviolet Absorber | 0.281 | 0.288 | 0.296 | 0.286 | 0.282 | 0.296 |
| Polyamide Wax 1* | 0.994 | 0 | | 0 | 0 | 0.471 |
| Polyamide Wax 2 | 0 | 0 | 0.3 | 0.6 | 0 | 0 |
| Polyamide Wax 3 | 0 | 0 | 0.3 | 0 | 0.6 | 0 |
| Polyamide Wax 4** | 0 | 4.626 | 0 | 0 | 0 | 0 |
| Polyethylene Wax | 0 | 0 | 0 | 0.15 | 0.15 | 0 |
| Butyl Acetate | 0 | 0 | 0 | 0 | 0 | 0 |
| Isobutyl Alcohol | 2.486 | 2.528 | 2.618 | 8.094 | 4.975 | 2.618 |
| Acetone | 0 | 0 | 0 | 0 | 0 | 0 |
| Mixed Dibasic Esters | 3.977 | 4.112 | 4.189 | 4.047 | 3.98 | 4.189 |
| Xylene* | 6.065 | 0 | 0 | 0 | 0 | 2.932 |
| Aromatic Hydrocarbon | 23.862 | 24.054 | 25.137 | 24.09 | 28.329 | 23.249 |
| Dipropylene Glycol Methyl Ether | 2.486 | 2.528 | 4.085 | 0 | 0 | 2.618 |

-continued

| Inventive Examples | 1 | 2 | 3 | 4 | 5 | 6 |
|---|---|---|---|---|---|---|
| Aromatic Hydrocarbon 2 | 0 | 0 | 0 | 0 | 0 | 0 |
| High Solids Enamel Resin* | 4.772 | 4.903 | 39.59 | 0 | 0 | 2.513 |
| Hydroxy functional acrylic resin | 0 | 0 | 0 | 0 | 0 | 0 |
| Alkyd Resin | 32.81 | 33.933 | 0 | 43.101 | 42.389 | 23.668 |
| Acrylic Copolymer | 0 | 0 | 0 | 0 | 0 | 0 |
| Silicone surfactant | 0 | 0 | 0 | 0 | 0 | 0 |
| DDBSA/AMP Solution | 0 | 0 | 0 | 0 | 0 | 0 |
| Acid Catalyst - High Bake | 1.12 | 1.162 | 1.179 | 1.139 | 1.12 | 1.179 |
| Carbon Black Dispersion 1 | 0 | 0 | 0 | 0 | 0 | 0 |
| Carbon Black Dispersion 2 | 0 | 0 | 0 | 0 | 0 | 0 |
| Carbon Black Dispersion 3 | 5.966 | 6.168 | 6.284 | 6.071 | 5.97 | 6.284 |
| Comparative Sag Control Agent 1 | 0 | 0 | 0 | 0 | 0 | 0 |
| Comparative Sag Control Agent 2 | 0 | 0 | 0 | 0 | 0 | 0 |
| Comparative Sag Control Agent 3 | 0 | 0 | 0 | 0 | 0 | 0 |
| Polyester Resin | 0 | 0 | 0 | 0 | 0 | 0 |
| Rheology Modifier | 0 | 0 | 0 | 0 | 0 | 0 |

*The process to create polyamide wax solution for incorporation into examples 1 and 6 was as follows. Polyamide wax 1 was slowly added to the high solids enamel resin while stirring with a high speed disperser at 2000 rpm for about 15 minutes until the material was thick and did not move with the temperature reaching between 40 and 50 C. The xylene was added to the mixture and stirred until homogeneous.

**The milling process for incorporation of polyamide wax 4 in example 2 was as follows. The alkyd resin, melamine formaldehyde resin 2, the high solids enamel resin, the dipropylene glycol methyl ether, and the polyamide wax 4 were combined and stirred for 5 minutes to incorporate. The mixture was then milled in a media mill using 0.8 mm diameter ceramic media while maintaining a temperature of less than 40 C.

| Comparative Examples | 7 | 8 | 9 | 10 | 11 | 12 |
|---|---|---|---|---|---|---|
| Bis(1,2,2,6,6-Pentamethyl-4-Piperdinyl) Se | 0.199 | 0.197 | 0 | 0 | 0 | 0 |
| Melamine-Formaldehyde Resin | 3.033 | 2.9 | 0 | 0 | 0 | 3.934 |
| Melamine Formaldehyde Resin 2 | 13.079 | 12.5 | 12.395 | 18.37 | 22.92 | 16.893 |
| Silicone additive | 0 | 0 | 0 | 0 | 0 | 0 |
| Hydroxylated acrylic resin with SCA | 21.798 | 0 | 0 | 0 | 0 | 0 |
| Hydroxylated acrylic resin with strong SCA | 0 | 40.4 | 0 | 0 | 0 | 0 |
| Ultraviolet Absorber | 0.265 | 0.254 | 0 | 0 | 0 | 0 |
| Polyamide Wax 1 | 0 | 0 | 0 | 0 | 0 | 0 |
| Polyamide Wax 2 | 0 | 0 | 0 | 0 | 0 | 0 |
| Polyamide Wax 3 | 0 | 0 | 0 | 0 | 0 | 0 |
| Polyamide Wax 4 | 0 | 0 | 0 | 0 | 0 | 0 |
| Polyethylene Wax | 0 | 0 | 0 | 0 | 0 | 0 |
| Butyl Acetate | 0 | 0 | 5.436 | 27.73 | 0 | 20.234 |
| Isobutyl Alcohol | 0 | 0 | 0 | 0 | 0 | 0 |
| Acetone | 0 | 0 | 0 | 0 | 10.883 | 0 |
| Mixed Dibasic Esters | 0 | 0 | 0 | 0 | 0 | 0 |
| Xylene | 0 | 0 | 0 | 0 | 0 | 0 |
| Aromatic Hydrocarbon | 0 | 0 | 0 | 0 | 0 | 0 |
| Dipropylene Glycol Methyl Ether | 0 | 0 | 0 | 0 | 0 | 0 |
| Aromatic Hydrocarbon 2 | 34.877 | 36.308 | 0 | 0 | 0 | 0 |
| High Solids Enamel Resin | 0 | 0 | 3.141 | 0.18 | 59.71 | 0 |
| Hydroxy functional acrylic resin | 0 | 3.2 | 0 | 0 | 0 | 0 |
| Alkyd Resin | 0 | 0 | 0 | 0 | 0 | 0 |
| Acrylic Copolymer | 22.272 | 0 | 0 | 0 | 0 | 0 |
| Silicone surfactant | 0.043 | 0.041 | 0.042 | 0.05 | 0.067 | 0.065 |
| DDBSA/AMP Solution | 0 | 0 | 0.983 | 1.28 | 1.597 | 1.602 |
| Acid Catalyst - High Bake | 1.056 | 1 | 0 | 0 | 0 | 0 |
| Carbon Black Dispersion 1 | 0 | 0 | 3.003 | 3.86 | 4.823 | 4.274 |
| Carbon Black Dispersion 2 | 3.378 | 3.2 | 0 | 0 | 0 | 0 |
| Carbon Black Dispersion 3 | 0 | 0 | 0 | 0 | 0 | 0 |
| Comparative Sag Control Agent 1 | 0 | 0 | 0 | 0 | 0 | 34.875 |
| Comparative Sag Control Agent 2 | 0 | 0 | 0 | 0 | 0 | 18.018 |
| Comparative Sag Control Agent 3 | 0 | 0 | 0 | 48.53 | 0 | 0 |

| Comparative Examples | 7 | 8 | 9 | 10 | 11 | 12 |
|---|---|---|---|---|---|---|
| Polyester Resin | 0 | 0 | 0 | 0 | 0 | 0.104 |
| Rheology Modifier | 0 | 0 | 75 | 0 | 0 | 0 |

The Components used in the Examples are described in greater detail below.

| Component | Description |
|---|---|
| Bis(1,2,2,6,6-Pentamethyl-4-Piperdinyl) Se | Tinuvin 292 |
| Melamine-Formaldehyde Resin | Cymel 3717 Resin |
| Melamine Formaldehyde Resin 2 | methylated, isobutylated, with high degree of alkylation (hexaether) melamine formaldehyde resin |
| Silicone additive | Byk-320 |
| Hydroxylated acrylic resin with SCA | Setalux 91756 VS-60 |
| Hydroxylated acrylic resin with strong SCA | Setalux 61767 VX-60 |
| Ultraviolet Absorber | Tinuvin 1130-Kombi |
| Polyamide Wax 1 | Thixatrol AS 8053 |
| Polyamide Wax 2 | Disparlon BB102 |
| Polyamide Wax 3 | Disparlon 6900 -20 X |
| Polyamide Wax 4 | Thixatrol P220 X |
| Polyethylene Wax | Disparlon 4200 - 10 |
| Butyl Acetate | Butyl Acetate |
| Isobutyl Alcohol | Isobutyl Alcohol |
| Acetone | Acetone |
| Mixed Dibasic Esters | Mixed Dibasic Esters |
| Xylene | Xylene |
| Aromatic Hydrocarbon | Solvesso 100 |
| Dipropylene Glycol Methyl Ether | Dipropylene Glycol Methyl Ether |
| Aromatic Hydrocarbon 2 | Aromatic 150 ND Fluid |
| High Solids Enamel Resin | 75% Acrylic resin (BMA/HPA = 60/40) in Solvesso 100 solvent |
| Hydroxy functional acrylic resin | Mw 5500, Mn 2200, 97 mgKOH/g, 75% solid in 90% aromatic hydrocarbon |
| Alkyd Resin | 71% Alkyd resin in aromatic hydrocarbon solvent |
| Acrylic Copolymer | 65% hydroxy functional branched acrylic resin (Mw 34500, 54 mg KOH/g) in aromatic hydrocarbon solvent |
| Silicone surfactant | 10% Dowsil 57 in aromatic 100 |
| DDBSA/AMP Solution | 48% aromatic sulfonic acid in 10% amino methyl propanol and 41% N-Butyl alcohol |
| Acid Catalyst | aromatic sulfonic acid reaction initiator for amino formaldehyde crosslinker (melamine) 50% in 11% 2-amino-2-methl-1propanol and 39% Isobutyl alcohol = 0.5% Nacure XP-221 |
| Carbon Black Dispersion 1 | 63.3% solvent 18% carbon black 18% acrylic dispersant solution |
| Carbon Black Dispersion 2 | 20% carbon black, 43% acrylic dispersant, 37% solvent |
| Carbon Black Dispersion 3 | 12% carbon black, 26% hydroxy functional polyester resin, 13% dispersing resin, 43% xylene, 6% butyl acetate |
| Comparative Sag Control Agent 1 | 3.33% SCA built in Polyester Resin Solids Composition of 81.44%; 18.56% Butyl acetate |
| Comparative Sag Control Agent 2 | 3.33% SCA built in Polyester resin Solids Composition of 92.280%; 7.720% Butyl acetate |
| Comparative Sag Control Agent 3 | 2.81% SCA built in High solid enamel resin BMA/HPA = 60/40 Solids Composition of 59% in 16.52% Butyl acetate |
| Polyester Resin | 93.7% resin solid in Alkane diols boiling point 253-260° C., density 0.9600 kg/L/acid number 4-6 mg KOH/g/TG: −48.5° C., OH number 165.1 mgKOH/g |
| Rheology Modifier | Crystasense HP4 (4%) in BMA/HPA = 60/40; MW = 7000, with 46% butyl acetate |

After formation, the Inventive Examples 1-6 and the Comparative Examples 7-12 are evaluated as described below to determine various physical properties.

| Example # | 1 | 2 | 3 | 4 | 5 | 6 |
|---|---|---|---|---|---|---|
| Stripe Overlap Visibility | ++++ | ++ | ++++ | ++ | ++ | ++ |
| 20° Sag | +++ | +++ | +++ | 0 | 0 | 0 |
| Nozzle Line Visibility | ++++ | ++++ | ++++ | ++++ | ++++ | ++++ |
| Nozzle Clogging | ++++ | ++++ | ++++ | ++++ | ++++ | ++ |

| Example # | 7 | 8 | 9 | 10 | 11 | 12 |
|---|---|---|---|---|---|---|
| Stripe Overlap Visibility | --- | ++ | +++++ | ++ | +++++ | + |
| 20° Sag | 0 | +++ | -- | +++ | ----- | ++++ |
| Nozzle Line Visibility | --- | +++ | ++++ | - | ++++ | -- |
| Nozzle Clogging | ---- | + | ++++ | ++ | +++++ | - |

Throughout these Examples, each "+" is a positive indicator indicating subjectively better performance as understood and evaluated by one of skill in the art. Each "-" is a negative indicator indicating subjectively poorer performance as understood and evaluated by one of skill in the art. If more than one "+" or "-" sign is used, this means even better, or poorer, performance, respectively, as understood and evaluated by one of skill in the art. "0" is indicative of performance in between + and -.

Stripe overlap visibility is assessed visually in the region where coating is applied in sequential application passes. It is found that as little as 1 micron thickness variation over a 5 mm distance parallel to the direction of application will result in stripe overlap visibility.

To evaluate 20° Sag, the following procedure is typically employed. A substrate panel is oriented horizontally prior to coating application. A high transfer efficiency applicator is used to apply 3 successive stripes of the coating composition to the horizontal substrate panel such that the composition will overlap to provide a continuous coated surface with a target wet film thickness (typically 30 microns or greater) and a coated substrate width of about 150 mm. After application of the composition, the panel is tilted so that the approximately 150 mm coated substrate width is at an angle of about 20 degrees from horizontal. After about 3-10 minutes at room temperature, with the panel angle maintained the same, the panel is baked at about 140° C. for about 30 minutes. Sag, if present, is evidenced by drips at the bottom edge of the coating, and is evaluated visually, as described in detail above.

Nozzle Line Visibility is observed as the presence of fine lines parallel to each other as well as the application direction and having a spacing the same as the adjacent nozzles in the applicator (~1 mm).

If coating performance was initially poor or degraded over time, nozzle clogging must be considered. If coating degradation occurred (missing or misdirected nozzle lines, reduced flow rate, pressure buildup), nozzle clogging can be ascertained by (1) plugging of a filter installed prior to the applicator and (2) missing lines during coating application followed by microscope verification of debris in nozzle. If no nozzle clogging was observed over an extended period of coating application, nozzle clogging was considered minimal (+++++). On the other hand, if nozzle clogging was observed upon startup of application, nozzle clogging was considered most severe (-----).

Figure 8:
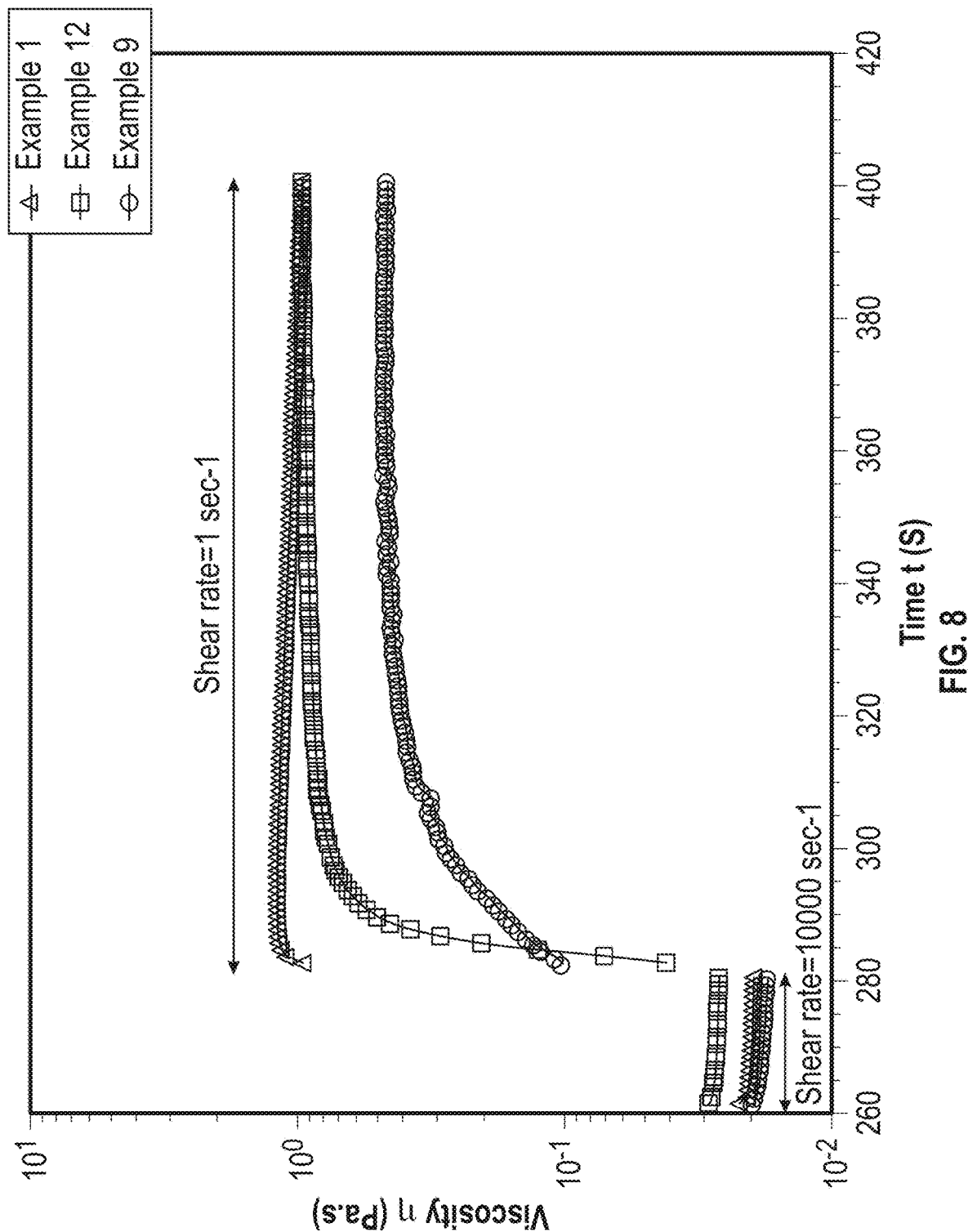
FIG. 8 is a line graph showing viscosity recovery measurements of viscosity as a function of time of Examples 1, 9, and 12 wherein viscosity is measured at the specified shear rate by ASTM 2196.

Moreover, Examples 1, 9, and 12 are evaluated to determine physical properties. FIG. 8 shows a viscosity recovery plot and test procedure. This Figure shows viscosity recovery measurements wherein viscosity is measured at the specified shear rate by ASTM 2196. For example, a sample is sheared in the rheometer at a shear rate of 10000 sec-1 for 20 seconds. The shear rate is reduced to 1 sec-1 and the viscosity is measured as a function of time. How fast the viscosity reaches at least 95% of its steady state value (typically at 100 seconds or more at 1 sec-1) is taken as the time required for viscosity recovery.

Figure 9:
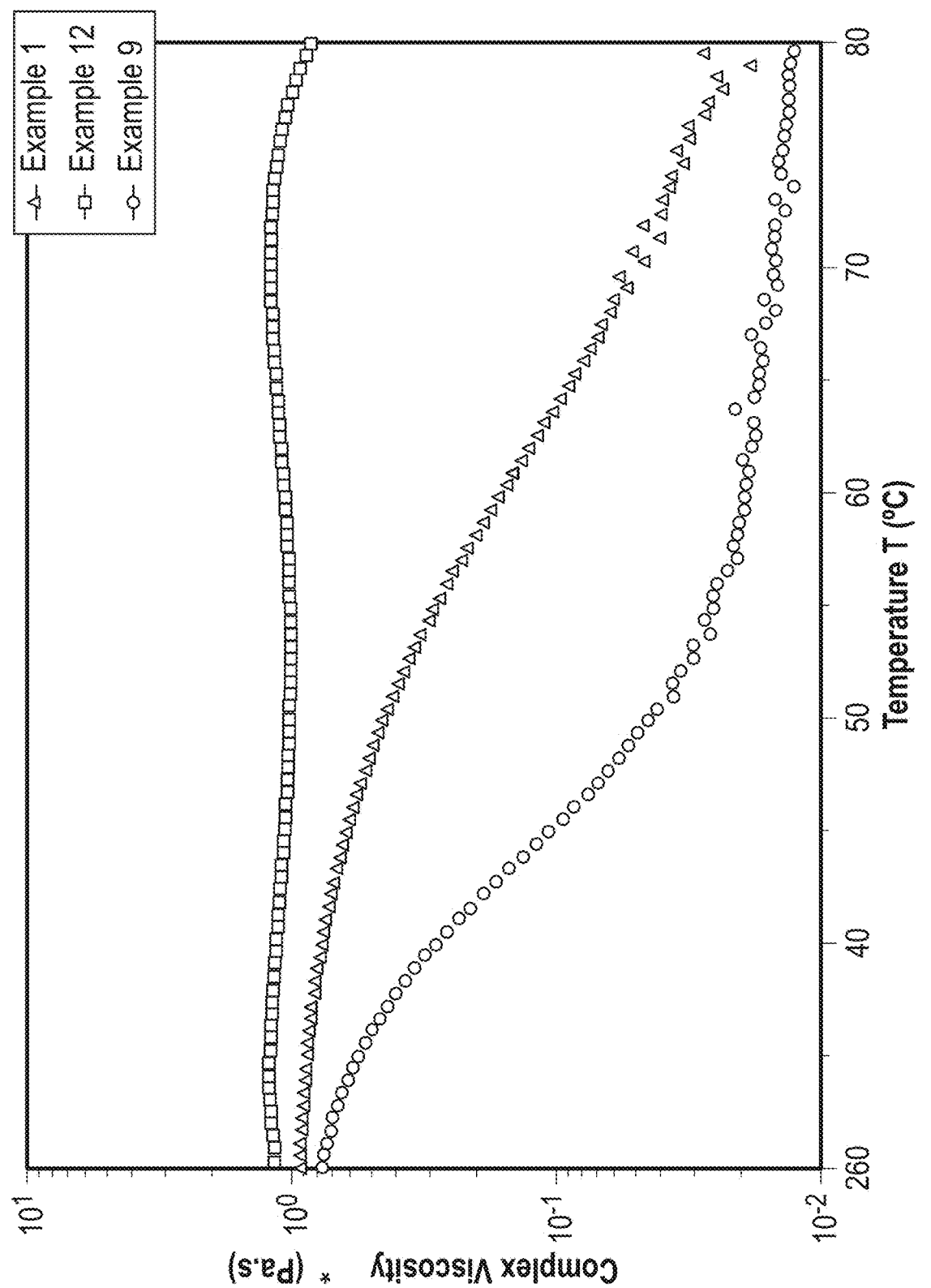
FIG. 9 is a line graph showing complex viscosity as a function of temperature of Examples 1, 9, and 12, wherein complex viscosity is measured according to ASTM D4440.

FIG. 9 shows complex viscosity vs. temperature measured according to ASTM D4440.

Figure 10:
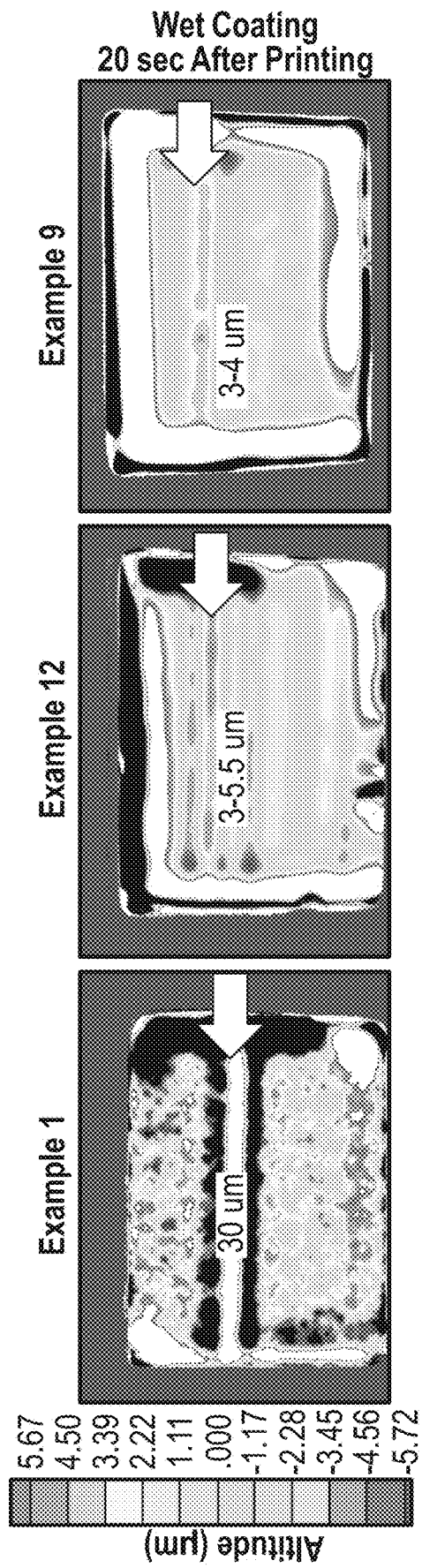
FIG. 10 shows Optimap surface profile measurements immediately after printing (wet) and after curing of Examples 1, 9, and 12.
Figure 10:
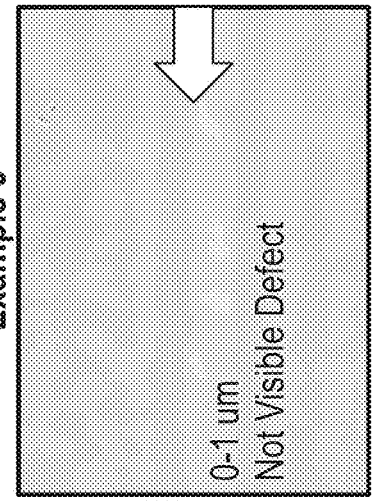
Figure 10:
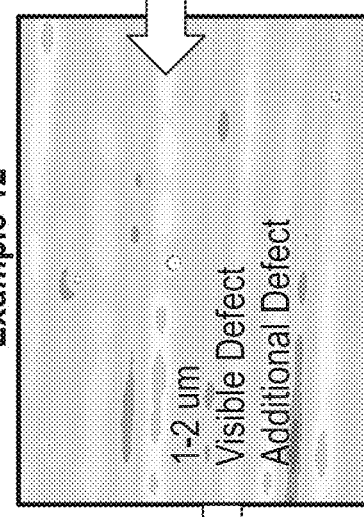
Figure 10:
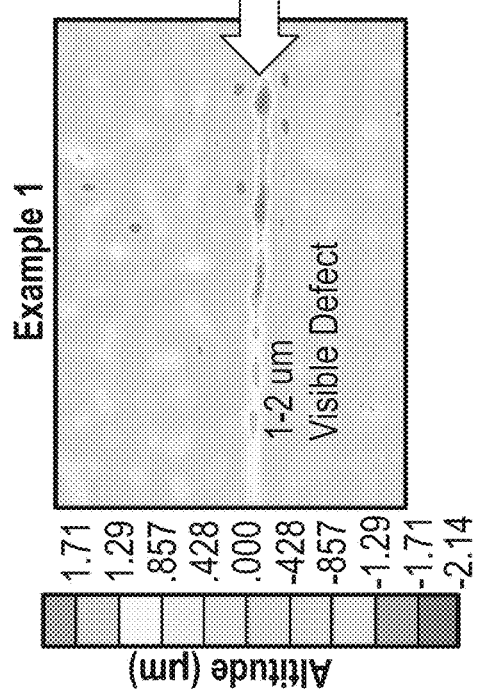

FIG. 10 shows Optimap surface profile measurements immediately after printing (wet) and after curing for the same examples. An Optimap™ PSD uses phase stepped deflectometry to determine the surface profile of an area approximately 79×57 mm. Here, coating surface profiles are shown which include the region of stripe overlap. For each image, the region of stripe overlap is identified by a red arrow. The color scale corresponding to coating height differences is shown on the left. Green represents the average coating surface height, whereas red (to white) represents a "hill" having a greater height compared to the average and blue (to black) represents a "valley" having a lesser height than the surface average. Since the Optimap must be placed in direct contact with the coating, for the wet coatings, around the edges, the height profile is distorted due to thinning of the coating upon contact with the gasket supporting the Optimap. However, undistorted images of the stripe overlap region are still obtained in the center of the image. The stripe overlap region is observed as a defect parallel to the direction of application and becomes more visible as the hills and valleys become more pronounced. For example 1, stripe overlap "hill" height was 30 microns above average greatly exceeding comparative examples 12 (~4 micron) and 9 (~3 micron).

The data set forth above and in FIGS. 8, 9 and 10 show that the best balance of minimal stripe overlap visibility, no nozzle line visibility and sag resistance without any nozzle clogging was obtained for examples including a polyamide wax. This is surprising in light of the fast viscosity recovery observed after a high shear rate application shown in FIG. 8 for example 1 vs. alternate rheology control additives used in examples 12 and 9. Based on the fast viscosity recovery, the expected poor flow and leveling observed immediately after application is shown in the after printing (wet) example in FIG. 10. However, the decrease in viscosity with temperature that would be expected during heating in an oven for coating cure, prior to substantial solvent evaporation, as shown by measurements in FIG. 9 resulted in substantial leveling of polyamide wax containing example 1 without being so low in viscosity to result in substantial sag to occur prior to cure as was the case for example 9

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It being understood that various changes may be made in the function and arrangement of elements described in an exemplary embodiment without departing from the scope as set forth in the appended claims.

What is claimed is:

1. A method of applying a one-component solvent-borne coating composition to a substrate utilizing a high transfer efficiency applicator to form a coating layer disposed on the substrate, said method comprising the steps of:
   providing the coating composition to the high transfer efficiency applicator; and
   applying the coating composition to the substrate through the high transfer efficiency applicator to form the coating layer on the substrate wherein a loss of volatiles after application through the high transfer efficiency applicator is less than about 0.5 weight percent based on a total weight of the coating composition,
   wherein the coating composition comprises:
   A. a resin comprising an acrylic, a polyester, or combinations thereof;
   B. a melamine cross-linker;
   C. an optional pigment;
   D. an organic solvent; and
   E. a polyamide wax comprising the reaction product of (i) a fatty acid derived from a C16-C48 fatty acid; and (ii) a polyamine having an amine functionality of two or more, and is present in an amount of from about 0.1 to about 4 weight percent based on a total weight of the coating composition;
   wherein the coating composition has a wet film thickness of at least about 30 microns measured at about 45 degrees without visible sag after cure at a temperature of about 60° C. or higher for at least 5 minutes;
   wherein the coating composition has a viscosity measured at a shear rate of about 1 s-1 that recovers, after a high shear rate of about 10000 s-1 is applied for about 20 seconds, to within about 95% of a steady state viscosity achieved at greater than about 100 seconds of continuous shearing at about 1 s-1, in less than about 5 seconds; and
   wherein the coating composition has a complex viscosity measured at a temperature of about 60° C. that is reduced to from about 60 to about 500 mPa-s when the complex viscosity measured at about 30° C. is from about 800 to about 8000 mPa-s.

2. The method of claim 1 wherein the polyamide wax further comprises a low volatility liquid alcohol which has a water solubility of less than about 10 mg/L.

3. The method of claim 1 wherein the polyamine is chosen from ethylenediamine, diethylenetriamine, triethylenetetramine, tetraethylenepentamine and combinations thereof.

4. The method of claim 1 wherein the polyamine is diethylenetriamine.

5. The method of any preceding claim wherein the fatty acid is derived from a C18 fatty acid.

6. The method of claim 5 wherein the C18 fatty acid is oleic acid.

7. The method of claim 1 wherein the fatty acid comprises about 28 to about 48 carbon atoms.

8. The method of claim 1 wherein the fatty acid comprises about 32 to about 36 carbon atoms.

9. The method of claim 1 wherein the polyamide wax is present in an amount of from about 0.1 to about 1.75 wt % based on a total weight of the coating composition.

10. The method of claim 1 wherein the coating composition has a high shear rate viscosity of from about 20 to about 70 mPa-s measured at 1000 s-1 and a low shear viscosity of from about 800 to about 8000 mPa-s measured at about a shear rate of 1 s-1.

11. The method of claim 1 wherein the coating composition further comprises a polyethylene wax.

12. The method of claim 1 further comprising the step of curing the coating composition on the substrate, wherein the high transfer efficiency applicator comprises a plurality of nozzles, wherein the step of applying is further defined as applying the coating composition through the nozzles in a plurality of lines on the substrate, and wherein the coating composition is free of visual appearance defects due to incomplete flow and leveling from individual nozzle lines after the step of curing.

13. The method of claim 1 further comprising the step of curing the coating composition on the substrate, wherein the high transfer efficiency applicator comprises a plurality of nozzles, wherein the step of applying is further defined as applying the coating composition through the nozzles in a plurality of lines on the substrate in a direction (X) along the substrate wherein each line partially overlaps with an adjacent line to form an overlap region and a non-overlap region, wherein the overlap region is visually smooth such that there is less than an about 1 micron variation in thickness of the overlap region as compared to the thickness of the non-overlap region measured after the step of curing over a 5 mm distance measured perpendicularly to the direction (X).

14. A method of applying a two-component solvent-borne coating composition to a substrate utilizing a high transfer efficiency applicator to form a coating layer disposed on the substrate, said method comprising the steps of:
   providing the coating composition to the high transfer efficiency applicator; and
   applying the coating composition to the substrate through the high transfer efficiency applicator to form the coating layer on the substrate wherein a loss of volatiles after application through the high transfer efficiency applicator is less than about 0.5 weight percent based on a total weight of the coating composition,
   wherein the coating composition comprises:
   A. a hydroxyl-functional resin;
   B. an isocyanate cross-linker;
   C. an optional pigment;
   D. an organic solvent; and
   E. a polyamide wax comprising the reaction product of (i) a fatty acid derived from a C16-C48 fatty acid; and (ii) a polyamine having an amine functionality of two or more, and is present in an amount of from about 0.1 to about 4 weight percent based on a total weight of the coating composition;
   wherein the coating composition has a wet film thickness of at least about 30 microns measured at about 45 degrees without visible sag after cure at a temperature of about 60° C. or higher for at least 5 minutes;
   wherein the coating composition has a viscosity measured at a shear rate of about 1 s-1 that recovers, after a high shear rate of about 10000 s-1 is applied for about 20 seconds, to within about 95% of a steady state viscosity achieved at greater than about 100 seconds of continuous shearing at about 1 s-1, in less than about 5 seconds; and
   wherein the coating composition has a complex viscosity measured at a temperature of about 60° C. that is reduced to from about 60 to about 500 mPa-s when the complex viscosity measured at about 30° C. is from about 800 to about 8000 mPa-s.

15. The method of claim 14 wherein the polyamide wax further comprises a low volatility liquid alcohol which has a water solubility of less than about 10 mg/L.

16. The method of claim 14 wherein the polyamine is chosen from ethylenediamine, diethylenetriamine, triethylenetetramine, tetraethylenepentamine and combinations thereof.

17. The method of claim 14 wherein the fatty acid is derived from a C18 fatty acid.

18. The method of claim 14 wherein the fatty acid comprises about 28 to about 48 caron atoms.

19. The method of claim 14 wherein the polyamide wax is present in an amount of from about 0.1 to about 1.75 wt % based on a total weight of the coating composition.

20. The method of claim 14 wherein the coating composition further comprises a polyethylene wax.

* * * * *